United States Patent
Smith et al.

(10) Patent No.: US 10,915,641 B2
(45) Date of Patent: Feb. 9, 2021

(54) IMPLEMENTATION OF CONTINUOUS REAL-TIME VALIDATION OF DISTRIBUTED DATA STORAGE SYSTEMS

(71) Applicant: PricewaterhouseCoopers LLP, New York, NY (US)

(72) Inventors: Alfred Michael Smith, Madison, NJ (US); Muhammad Emad Khan, New York, NY (US); Henry Hwangbo, Northbrook, IL (US); Timothy Kyunghyun Won, Rockville, MD (US)

(73) Assignee: PricewaterhouseCoopers LLP, New York, NY (US)

( * ) Notice: Subject to any disclaimer, the term of this patent is extended or adjusted under 35 U.S.C. 154(b) by 121 days.

(21) Appl. No.: 16/175,700

(22) Filed: Oct. 30, 2018

(65) Prior Publication Data

US 2019/0130114 A1  May 2, 2019

Related U.S. Application Data

(60) Provisional application No. 62/579,095, filed on Oct. 30, 2017, provisional application No. 62/579,093, filed on Oct. 30, 2017.

(51) Int. Cl.
*G06F 21/00* (2013.01)
*G06F 21/57* (2013.01)
(Continued)

(52) U.S. Cl.
CPC ........ *G06F 21/577* (2013.01); *G06F 16/2365* (2019.01); *G06F 16/2379* (2019.01);
(Continued)

(58) Field of Classification Search
CPC ...... G06F 21/60; G06F 21/602; G06F 21/604; G06F 21/64; G06F 21/645; G06F 21/62;
(Continued)

(56) References Cited

U.S. PATENT DOCUMENTS

2005/0197952 A1  9/2005  Shea et al.
2015/0363783 A1* 12/2015  Ronca ................. G06Q 20/065
                                                              705/71
2017/0257358 A1  9/2017  Ebrahimi et al.

FOREIGN PATENT DOCUMENTS

WO  2017/079218 A1  5/2017

OTHER PUBLICATIONS

International Search Report and Written Opinion dated Jan. 17, 2019, directed to International Application No. PCT/US2018/058293;13 pages.

* cited by examiner

*Primary Examiner* — Edward Zee
(74) *Attorney, Agent, or Firm* — Morrison & Foerster LLP

(57) ABSTRACT

Provided herein is a system and method for implementing a real-time and continuous validation tool for a distributed ledger-based computing system (i.e., blockchain). In one or more examples a real-time validation tool and system can continuously monitor a blockchain computing system for activities that indicate abnormal or risky behavior, and can generate a report to a user that details those events. The real-time validation tool can be implemented as a node in a blockchain computing system and can use information gleaned from blockchain activity occurring in real-time as well as external data gathered from various sources to determine if one or more events has occurred that is indicative of abnormal or risky activity occurring within the blockchain computing system. The validation tool can be used to improve and secure an existing blockchain computing system against cyber intrusions and various integrity issues.

21 Claims, 32 Drawing Sheets

(51) Int. Cl.
| | |
|---|---|
| *G06F 16/23* | (2019.01) |
| *H04L 9/32* | (2006.01) |
| *G06Q 20/40* | (2012.01) |
| *G06F 21/55* | (2013.01) |
| *G06F 21/10* | (2013.01) |
| *G06Q 20/06* | (2012.01) |
| *G06F 21/60* | (2013.01) |
| *H04L 29/06* | (2006.01) |
| *G06Q 20/38* | (2012.01) |
| *H04L 9/06* | (2006.01) |
| *H04L 12/24* | (2006.01) |
| *G06F 9/54* | (2006.01) |

(52) U.S. Cl.
CPC .............. *G06F 21/10* (2013.01); *G06F 21/55* (2013.01); *G06F 21/60* (2013.01); *G06Q 20/065* (2013.01); *G06Q 20/38215* (2013.01); *G06Q 20/40* (2013.01); *H04L 9/0637* (2013.01); *H04L 9/3236* (2013.01); *H04L 9/3297* (2013.01); *H04L 41/22* (2013.01); *H04L 63/14* (2013.01); *H04L 63/1433* (2013.01); *G06F 9/54* (2013.01); *G06F 2221/034* (2013.01); *G06F 2221/2101* (2013.01); *G06Q 2220/00* (2013.01); *H04L 2209/38* (2013.01); *H04L 2209/56* (2013.01)

(58) Field of Classification Search
CPC ............. G06F 21/6218; G06F 21/6227; G06F 21/6245
See application file for complete search history.

DASHBOARD

Real-Time Testing | Bi-Monthly Testing Results | Quarterly Opinion

Current Bi-Monthly Reporting Period | Real-Time Testing Activity

Todays Date: 01.01.2018   Time: 09:20 AM | Bi-Monthly Reporting Period: 12.15.2017-12.31.2017

Order Entry

Total Transactions: 200

| Testing Report Name | Observations |
|---|---|
| Rule 1: Lorem ipsum | 10 |
| Rule 2: Lorem ipsum lores | 5 |
| Rule 3: Lorem ipsum dores cona | 5 |
| Rule 4: Lorem ipsum dos treas | 7 |
| Rule 5: Lorem ipsum dolor sit amet | 6 |

Total: 33

Cash In

Total Transactions: 120

| Testing Report Name | Observations |
|---|---|
| Rule 6: Lorem ipsum dolor sit amet | 9 |
| Rule 7: Lorem ipsum dolor | 10 |
| Rule 8: Lorem ipsum dos treas | 4 |
| Rule 9: Lorem ipsum gona josr | 4 |
| Rule 10: Lorem ipsum | 3 |
| Rule 11: Lorem ipsum dolor sit | 2 |
| Rule 12: Lorem ipsum roni fune | 1 |

Cash Out

| Testing Report Name | Observations |
|---|---|
| Rule 13: Lorem ipsum dolor sit am | 10 |
| Rule 14: Lorem ipsum dos | 12 |
| Rule 15: Lorem ipsum conie | 4 |
| Rule 16: Lorem ipsum con dolor sa | 9 |
| Rule 17: Lorem ipsum iona conie | 3 |
| Rule 18: Lorem ipsum dolor aine | 6 |
| Rule 19: Lorem ipsum ia conte qre | 1 |

Settlement

| Testing Report Name | Observations |
|---|---|
| Rule 20: Lorem ipsum dolor sit ame | 1 |
| Rule 21: Lorem ipsum troue lian | 3 |
| Rule 22: Lorem ipsum joan conet | 10 |
| Rule 23: Lorem ipsum | 2 |
| Rule 24: Lorem ipsum doir | 4 |
| Rule 25: Lorem ipsum jon treaq | 2 |

Total: 34

ISSUE CONFIRMATION

Once you click sign off, you cannot undo this action. Do you want to proceed?

[ Cancel ]   [ Finalize ]

Current Status

Color Key
- Observation Noted
- Exception Noted
- No Exceptions

FROM FIG. 7K-1

FROM FIG. 7N-1

FROM FIG. 70-1

FIG. 70-2

| Payment Subprocess | | Risk Description | Assigned Risk Level | Audit Rating | Audit Rating Comments |
|---|---|---|---|---|---|
| 1 | Order Entry | Order entry book and ledger settlement Cash In debits in the Portal and LibO do not match, which could result in unprocessed orders and may lead to financial, operational, and legal risks | High | ◯ | Lorem ipsum dolor sit amet, consectetur adipiscing elit. Morbi quis risus ac lacus luctus dictum. Etiam pellentesque, lacus vitae ultricies pellentesque, urna turpis vehicula elit, sed molestie felis quam id risus. Curabitur tincidunt, elit nec laoreet eleifend, <br><br>nisi nisi aliquam lacus, sit<br><br>Emad Khan 12.10.2017 |
| 2 | Cash In | Cash-in requests processing status are not monitored, which may lead to discrepancies between amounts expected to be received from the buyer versus amounts received and recorded at a point in time | Medium | ☐ | Lorem ipsum dolor sit amet, consectetur adipiscing elit. Morbi quis risus ac lacus luctus dictum. Etiam pellentesque, lacus vitae ultricies pellentesque, urna turpis vehicula elit, sed molestie felis quam id risus. Curabitur tincidunt, elit nec laoreet eleifend,<br><br>nisi nisi aliquam lacus, sit<br><br>Emad Khan 12.10.2017 |
| 3 | Cash Out | Inaccurate or untimely post payment confirmation status updates between Linq, chain, and Citi may delay or compromise Settlement process. | High | ◯ | Lorem ipsum dolor sit amet, consectetur adipiscing elit. Morbi quis risus ac lacus luctus dictum. Etiam pellentesque, lacus vitae ultricies pellentesque, urna turpis vehicula elit, sed molestie felis quam id risus. Curabitur tincidunt, elit nec laoreet eleifend,<br><br>nisi nisi aliquam lacus, sit<br><br>Emad Khan 12.10.2017 |
| 4 | Settlement | Discrepancies in the disbursement of payments to the issuer and participants may lead to financial, reputational and legal risks | Medium | △ | Lorem ipsum dolor sit amet, consectetur adipiscing elit. Morbi quis risus ac lacus luctus dictum. Etiam pellentesque, lacus vitae ultricies pellentesque, urna turpis vehicula elit, nisi nisi aliquam lacus, sit<br><br>James Conner 12.10.2017 |

FROM FIG. 7P-1

FIG. 7P-2

DASHBOARD

| Real-Time Testing | Bi-Monthly Testing Results | Quarterly Opinion |

Current Bi-Monthly Reporting Period

Today's Date: 10.23.2017    Time: 09:20 AM

Real-Time Testing Activity

Bi-Monthly Reporting Period: 01.01.2017 - 01.16.2017

Testing Progress 01.01.2017                                                                                01.16.2017

Order Entry

Total Transactions: 200
Test Procedures

| Test Procedures | Observations |
|---|---|
| Test Procedure 1: Name | 10 |
| Test Procedure 2: Name | 23 |
| | Total : 33 |

Cash In

Total Transactions: 120
Test Procedures

| Test Procedures | Observations |
|---|---|
| Test Procedure 3: Name | 10 |
| Test Procedure 4: Name | 20 |
| Test Procedure 5: Name | 30 |
| Test Procedure 6: Name | 5 |
| Test Procedure 7: Name | 6 |
| | Total : 71 |

Cash Out

Total Transactions: 120
Test Procedures

| Test Procedures | Observations |
|---|---|
| Test Procedure 8: Name | 17 |
| Test Procedure 9: Name | 12 |
| Test Procedure 10: Name | 30 |
| | Total: 59 |

Settlement

Total Transactions: 200
Testing Report Name

| Testing Report Name | Observations |
|---|---|
| Test Procedure 11: Name | 1 |
| Test Procedure 12: Name | 3 |
| Test Procedure 13: Name | 4 |
| Test Procedure 14: Name | 2 |
| Test Procedure 15: Name | 4 |
| Test Procedure 16: Name | 2 |
| Test Procedure 17: Name | 3 |
| Test Procedure 18: Name | 3 |
| | Total : 34 |

FROM FIG. 7R-1

FIG. 7R-2

IMPLEMENTATION OF CONTINUOUS REAL-TIME VALIDATION OF DISTRIBUTED DATA STORAGE SYSTEMS

CROSS REFERENCE TO RELATED APPLICATIONS

The present application which claims the benefit of U.S. Provisional Patent Application Ser. No. 62/579,093, filed Oct. 30, 2017, and U.S. Provisional Patent Application Ser. No. 62/579,095, filed Oct. 30, 2017, each of which are incorporated herein by reference in their entirety and for all purposes.

FIELD OF THE DISCLOSURE

The present disclosure relates generally to continuous real-time validation of distributed data storage systems, such as, for example, blockchain-based data storage systems.

BACKGROUND OF THE DISCLOSURE

A distributed data storage (which may be referred to as a distributed database) system may include data storage devices that are not connected to a common processing unit, but are in different computing systems located at the same physical location or dispersed across one or more networks of interconnected computing systems at different physical locations. The data storage devices may communicate with each other via one or more wired or wireless communication networks. Typically, each of the data storage devices includes a copy of the stored data. Storing copies of the data in different data storage devices may eliminate a single point-of-failure and may induce both higher availability and increased reliability of the stored data.

Blockchain technology may be used to implement a distributed data storage system. In the blockchain technology, a system of networked nodes, e.g., computers or servers, each store a copy of the entire distributed data storage system. The blockchain-based distributed data storage system is often referred to as a blockchain. Whenever a group of data records is to be added to the distributed database, i.e., blockchain, each node may independently verify the group of data records in a batch process known as generating a block (also referred to as a data block). In the batch process, a node verifies the group of data records based on its copy of the blockchain storing previously verified data records. A node that generates the block may transmit the generated block to every other node in the system. In current implementations, only after the block has been verified by each node in the system may each node add the block to its copy of the blockchain. As each of the nodes independently verifies the block, blockchain technology may reduce the risk of a single point-of-attack or a single point-of-failure. Further, since a copy of the blockchain is maintained at each node, the data can be stored in a redundant manner.

A blockchain is a record of data activities. These data activities can be transactions in a distributed ledger, and/or any movement of money, goods, and/or secured or unsecured data involved, for example, in a purchase at a supermarket, in the creation and storage of a user's digital identification, in the assignment of a government ID number, in energy data exchange in the energy industry, in an e-voting service, or in the recording, tracking, and transferring of deeds and contractual agreements.

FIG. 1 illustrates a blockchain process flow in accordance with examples of the disclosure. The blockchain process flow 100 can begin at step 102, wherein a user/party can request to implement a transaction in the blockchain. Examples of transactions can be storing data such as a record to a distributed ledger. Once the request has been made at step 104, the transaction can be broadcast to other computers (known as nodes) in the network. At step 106, the network of nodes can then validate the transaction using a mutually a priori agreed upon algorithm. Once each node in the network of nodes validates the transaction, the process can move to step 108, wherein the verified transaction can be combined with other transactions (described in detail below) to create a new block of data for the ledger. Once the verified transaction has been combined, the process can move to step 110 wherein the new block can be added to the network's block chain. The new block can be added in such a way as to make it permanent and unalterable (i.e., through the use of cryptography). Once the new block has been added the process can move to step 112 wherein the transaction is completed.

As shown in FIG. 1, a blockchain needs to do two things: gather and order data into blocks, and then chain them together securely using cryptography. A blockchain is a decentralized ledger of all transactions in a network. Using blockchain technology, participants in the network can confirm transactions without the need for a trusted third-party intermediary.

FIG. 2 illustrates the process of generating a data block in a blockchain in accordance with examples of the disclosure. In the process 200, a piece of digital content (i.e., a new transaction represented in binary) can be received. Once received, the process can move to step 204 wherein a hash function is applied to the received transaction, so as to combine it with data from a pre-existing block in the blockchain. The output of the hash function can produce a fixed and smaller-in-length unique digital output. Hash algorithms can carefully designed to flow one-way making it impossible to determine the original digital content from the output once the hash algorithm is applied. Every new block in the blockchain may be linked with the hash function of the previous block to create a chain. At step 206, once the has function has been applied, an output can be generated. The output of the hash function can be a part of the data that is used in the creation of blocks, and these blocks can then cryptographically chained together at step 208. This process of creating blocks allows the blockchain system to prove that a file existed in a particular format at a given time without having to reveal the data in the file.

One of the benefits of blockchain is that every participant in the network has simultaneous access to a view of the information, thus allowing almost real-time data availability and transparency that can eliminate the need for reconciliation. Also, the integrity and security of the information on the blockchain are ensured with cryptographic functions that can prevent unwanted intrusion on the network from non-authenticated participants. In blockchain technology, verification can be achieved by participants confirming changes with one another, thus replacing the need for a third party to authorize transactions and providing a facility for peers in the network to validate updated information, thereby ensuring the validity and integrity of the data on the blockchain. Another benefit of blockchain includes the ability to run additional business logic; this means that agreement on the expected behavior of financial instruments can be embedded in the blockchain, which can facilitate the ability to design and implement shared workflow and enhance automation.

Also, the ability to issue a digital currency or a digital asset designed to work as a medium of exchange using cryptography to secure the transactions and to control the creation of additional units facilitates the ability to create and move assets without a trusted third party in the blockchain.

SUMMARY OF THE DISCLOSURE

Blockchain presents a challenge to the traditional validation (also referred to as audit) approach, given there's no practical way to use point-in-time forensic analysis—the standard validation tool. Attempting to conduct a point-in-time forensic retrospective analysis can be ineffective and wildly inefficient. The conventional approach to auditing can negate one of the benefits of implementing blockchain in the first place: the promise of increased administrative efficiency. Also, the traditional validation approach can require the entire blockchain hash function to be reversed to obtain transparency of the digital content without breaking the chain or sequential order of the blocks. Such approach could cause significant technical complexities, challenges, and inefficiencies in the validation of a blockchain-based data storage system.

Increases in the volume of data activities and rapidly evolving complex technologies are creating a critical need for business, technology, and compliance functions to be prepared, adaptive, and agile to emerging challenges. Due to the increase in data activities, current validation methodologies that are manual, sample-based, and point-in-time do not provide the needed level of confidence. Validation methodologies need to shift from a manual to an automated and continuous approach to address a significant increase in data activities and emerging, complex new technologies. Current audit methodologies cannot provide the necessary assurance in areas where a blockchain is used.

Accordingly, there is a need for systems and methods to replace the conventional validation approach with a real-time validating process to build confidence and assurance in the blockchain technology. The concept behind real-time validating is to inspect data activities closer and closer to the point of occurrence. Real-time validating eliminates the concept of sampling in the conventional validating process. The purpose of sampling is to perform backwards-looking assessments of segments of populations to draw conclusions about the rest of the population. The embodiments described herein provide blockchain assurance-related baselines that eliminate the need for sampling in blockchain validating.

The present disclosure is thus directed to a real-time validation tool and system that can continuously monitor a blockchain computing system for activities that indicate abnormal or risky behavior, and can generate a report to a user that details those events. The real-time validation tool can be implemented as a node in a blockchain computing system and can use information gleaned from blockchain activity occurring in real-time as well as external data gathered from various sources to determine if one or more events has occurred that is indicative of abnormal or risky activity occurring within the blockchain computing system.

BRIEF DESCRIPTION OF THE FIGURES

FIGS. 7A, 7B, 7C, 7D, 7E, 7F, 7G, 7H, 7I, 7J, 7K-1, 7K-2, 7L-1, 7L-2, 7M-1, 7M-2, 7N-1, 7N-2, 7P-1, 7P-2, 7O-1, 7O-2, 7Q, 7R-1, and 7R-2 illustrate exemplary screen shots of the reports that can be generated by the real-time auditing tool according to examples of the disclosure.

Illustrative embodiments will now be described with reference to the accompanying drawings. In the drawings, like reference numerals generally indicate identical, functionally similar, and/or structurally similar elements.

DETAILED DESCRIPTION

Figure 1:
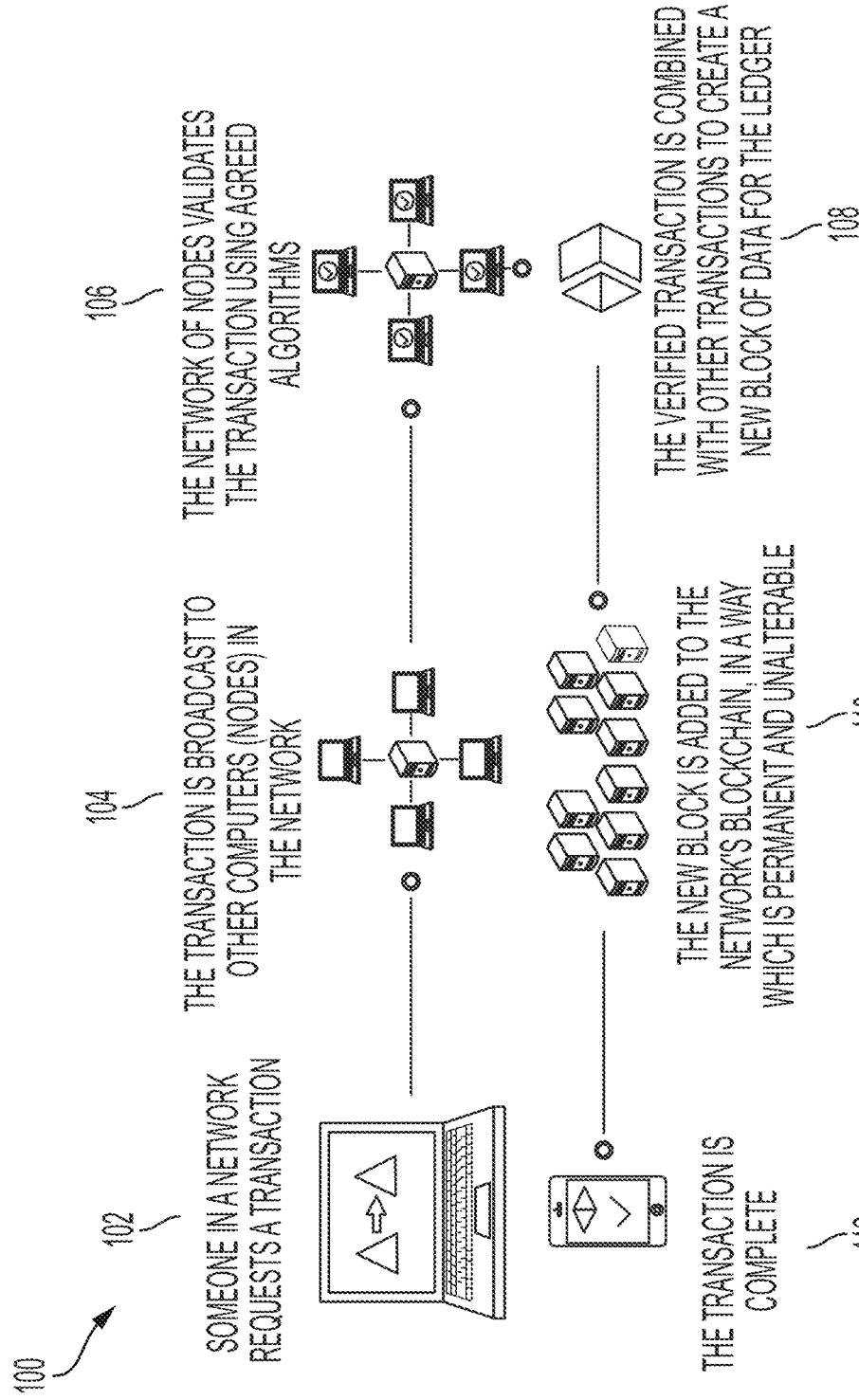
FIG. 1 illustrates a blockchain process flow in accordance with examples of the disclosure.
Figure 2:
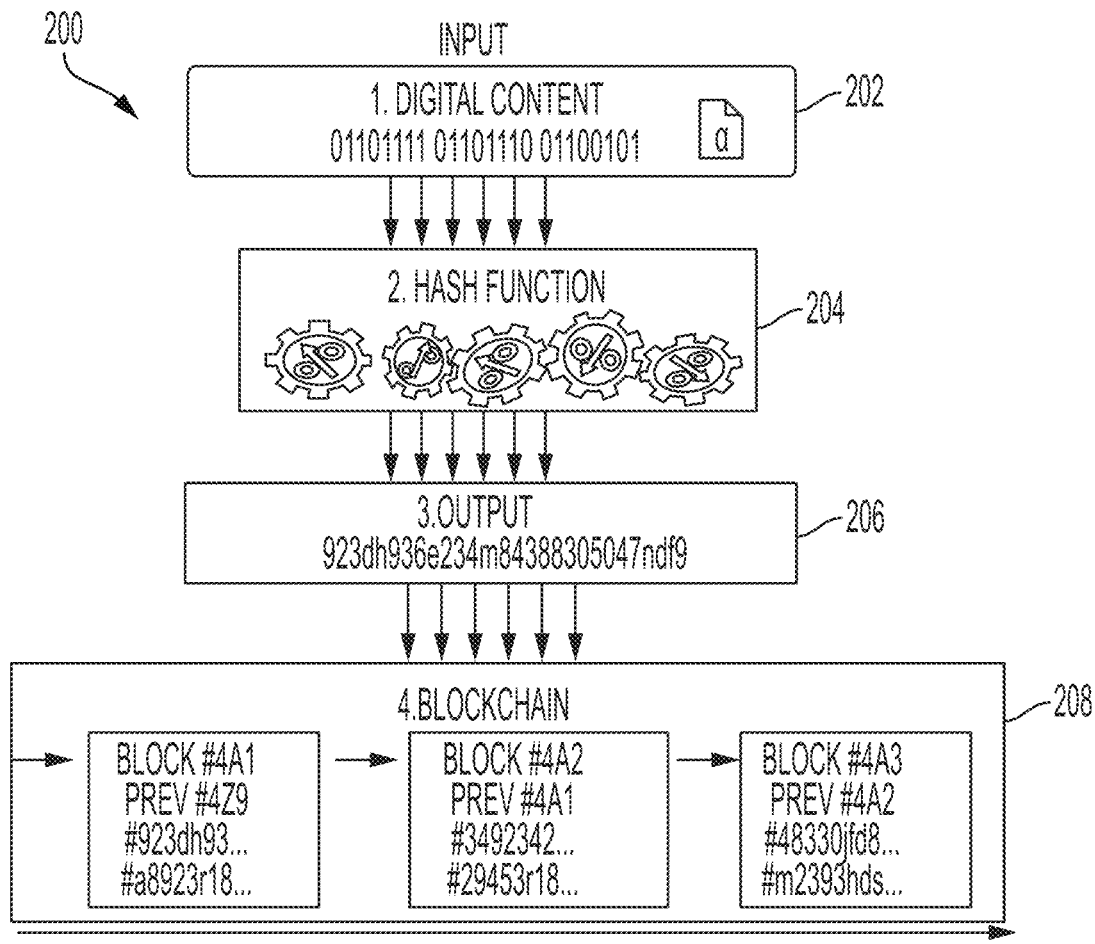
FIG. 2 illustrates the process of generating a data block in a blockchain in accordance with examples of the disclosure.

Embodiments of the present disclosure may be implemented in hardware, firmware, software, or any combination thereof. Embodiments of the present disclosure may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read-only memory (ROM); random access memory (RAM); magnetic disk storage media; optical storage media; flash memory devices; and others. Further, firmware, software, routines, and instructions may be described herein as performing certain actions. However, it should be appreciated that such descriptions are merely for convenience and that such actions in fact result from computing devices, processors, controllers, or other devices executing the firmware, software, routines, instructions, etc.

The embodiments described herein may be implemented within a local computer system. The computer system may be implemented in the contexts of, for example, computing systems, networks, servers, or combinations thereof. The computer system includes one or more processors and main memory. Main memory may store, in part, instructions and data for execution by processors. Main memory stores the executable code when in operation, in this example. The computer system may further include a mass data storage, a portable storage device, output devices, user input devices, a graphics display system, and/or peripheral devices.

The components of the computer system may be connected to a communication infrastructure (e.g., a bus or network). Processors and main memory may be connected via a local microprocessor bus, and the mass data storage, peripheral device(s), portable storage device, and graphics display system may be connected via one or more input/output (I/O) buses.

Mass data storage, which can be implemented with a magnetic disk drive, solid state drive, or optical disk drive, is a non-volatile storage device for storing data and instructions for use by processor. Mass data storage may store the system software for implementing embodiments of the present disclosure for purposes of loading that software into main memory.

A portable storage device may operate in conjunction with a portable non-volatile storage medium, such as a flash drive, floppy disk, compact disk, digital video disc, or universal serial bus (USB) storage device, to input and output data and code to and from the computer system. The system software for implementing embodiments of the present disclosure may be stored on such a portable medium and input to the computer system via the portable storage device.

User input devices can provide a portion of a user interface. User input devices may include one or more microphones; an alphanumeric keypad, such as a keyboard, for inputting alphanumeric and other information; or a pointing device, such as a mouse, trackball, stylus, or cursor direction keys. User input devices can also include a touchscreen. Suitable output devices include speakers, printers, network interfaces, and monitors.

Graphics display systems may include a liquid crystal display (LCD) or other suitable display device. Graphics display systems may be configurable to receive textual and graphic information, and process the information for output to the display device.

Peripheral devices may include any type of computer support device that adds additional functionality to the computer system.

The components provided in the computer system are those typically found in computer systems that may be suitable for use with embodiments of the present disclosure and are intended to represent a broad category of such computer components that are well known in the art. Thus, the computer system can be a personal computer (PC), hand-held computer system, telephone, mobile computer system, workstation, tablet, phablet, mobile phone, server, minicomputer, mainframe computer, wearable, or any other computer system. The computer may also include different bus configurations, networked platforms, multi-processor platforms, and the like. Various operating systems may be used, including UNIX, LINUX, Windows, MAC OS, PALM OS, QNX ANDROID, IOS, CHROME, TIZEN, and other suitable operating systems.

The processing for various embodiments may be implemented in software that is cloud-based. In some embodiments, the computer system described above may be implemented as a cloud-based computing environment, such as a virtual machine operating within a computing cloud. In other embodiments, the computer system may itself include a cloud-based computing environment, where the functionalities of the computer system are executed in a distributed fashion. Thus, the computer system, when configured as a computing cloud, may include pluralities of computing devices in various forms.

The cloud may be formed, for example, by a network of web servers that constitute a plurality of computing devices, such as a computer system, with each server (or at least a plurality thereof) providing processor and/or storage resources. These servers may manage workloads provided by multiple users (e.g., cloud-resource customers or other users). Typically, each user places workload demands upon the cloud that vary in real time, sometimes dramatically. The nature and extent of these variations typically depends on the type of business associated with the user.

Computer program code for carrying out operations for aspects of the present disclosure may be written in any combination of one or more programming languages, including an object-oriented programming language such as Java, Smalltalk, C++, or the like, and conventional procedural programming languages such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be coupled with the user's computer through any type of network, including a local area network (LAN) or a wide area network (WAN); or the connection may be made to an external computer (for example, through the Internet using an Internet service provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to the processor of a general-purpose computer or special-purpose computer, or other programmable data-processing apparatus to produce a machine, such that the instructions, which execute via the processor of the computer or other programmable data-processing apparatus, create means for implementing the functions/acts specified in the flowchart and/or block diagram block or blocks.

These computer program instructions may also be stored in a computer-readable medium that can direct a computer, other programmable data-processing apparatus, or other devices to function in a particular manner, such that the instructions stored in the computer-readable medium produce an article of manufacture including instructions that implement the function/act specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special-purpose hardware-based systems that perform the specified functions or acts, or combinations of special-purpose hardware and computer instructions.

While various embodiments have been described below, it should be understood that they have been presented by way of example only, and not limitation. The descriptions are not intended to limit the scope of the invention to the particular forms set forth herein. Thus, the breadth and scope of a preferred embodiment should not be limited by any of the exemplary embodiments described herein. It should be understood that the description is illustrative and not restrictive. To the contrary, the present descriptions are intended to cover such alternatives, modifications, and equivalents as may be included within the spirit and scope of the invention as defined by the appended claims, and otherwise appreciated by one of ordinary skill in the art.

Blockchain validation tool/system (may be referred as Blockchain Continuous Assurance, Compliance, Monitoring, and Validating Solution or Blockchain Continuous Validating Solution) is composed of a continuous validating methodology, blockchain risk evaluation system (may be referred to as blockchain risk framework), and blockchain assurance software that enables data activity-level assurance for any given blockchain-based data storage system use case. The continuous methodology may be designed to accommodate real-time evidence gathering and testing, and on-demand or continuous opinions on the state of a given business process in a blockchain-based data storage system. The blockchain risk framework may be used to evaluate the current state of a blockchain-based data storage system use case against different risk categories and sub-categories. Using the data gathered from the blockchain risk framework (or other externally provided data), the blockchain assurance software may be designed to integrate a read-only blockchain node of a blockchain network with off-blockchain capabilities that can gather necessary underlying data elements, perform real-time validity testing of data activities in one or more data blocks of the blockchain-based data storage system, and produce continuous reporting to one or more stakeholders in the validation tool.

As described above, existing approaches to transaction audits can be ineffective in blockchain, as the technology does not lend itself to point-in-time, retrospective, sample-based analysis due to the use of complex hashing functions, encryption techniques, and mechanisms that can vary from one use case to the another. A traditional audit approach can require extensive effort, resources, and time in addressing the technical challenges to decouple or unwind the chain of information/data stored on blockchain for validating. Further, increases in transaction volumes are making sample-based analysis much less effective or practical.

Additionally, there are several variants of blockchain technology available in the market (i.e., Chain.com, Blockstream, Ethereum, Ripple, Hyperledger, etc.) that organizations are employ to implement a blockchain. This non-standardized use of technology can lead to inconsistent use of platform, protocol, consensus, and encryption mechanisms, which can make every use case unique and exposes the environment to a distinct and particularized sets of risks. Further, the lack of a standardized strategy, approach, and risk framework in the industry makes validating blockchain a challenge for the practitioners.

Blockchain validation tools/systems can comprise of combinations of continuous validating methodologies, blockchain validating criteria, blockchain risk frameworks, and software that provides transaction-level assurance. The approach and system framework outlined above can be industry, use-case, and blockchain technology-variant agnostic so that practitioners across all industries and sectors can use it to address the risk assurance and compliance needs independent of the blockchain technology variant and use case. The blockchain validation tools/systems can be designed and developed to consolidate blockchain-related assurance, compliance, monitoring, and audit activities into categories by nature of activity and then embedded into a software/tool for execution. Then, data from the underlying blockchain ledger, as well as from other upstream and downstream systems affecting the use case, may be drawn. A read-only blockchain node can be deployed in the given environment integrated with off-blockchain capabilities that enable to gather underlying data elements, which is used for real-time automated testing and continuous reporting purposes to provide the transparency and optics to meet the assurance relative to internal and external compliance needs of key stakeholders. This can enable an organization to fully automate any and all necessary audit- or assurance-based procedures and provide active transparency for them on a real-time basis (or some other interval if preferred). The tool could also be the foundation for the broader context of real time and continuous validating in other hyper technical forms of technology, like robotics process automation, artificial intelligence, and IoT.

This is the next stage in the evolution of the assurance and audit profession, as validating via the computer becomes validating by the computer. This trend is expected to become more prominent as artificial intelligence and other automation technologies continue to push validating into a truly real-time process. Such implementations allow reviewing and confirming the validity of transactional data against/relative to applicable risks, and controlling objective requirements in real time. Reviewing what happens in real time along with continuous reporting, rather than testing selectively by taking a sample-based approach after the fact, is a significant improvement on current assurance and audit techniques.

The use of continuous validating, continuous validating criteria, blockchain risk framework, in combination of a given validating software/tool (may be referred to as assurance software) will provide a standardized yet innovative approach that is agnostic to blockchain technology variants, industry and use case, at the same time, enables an audit or compliance practitioner to identify the stakeholders assurance and compliance requirements and define parameters (risks, control objectives, controls, testing objectives and procedures, and reporting). These parameters can then be executed manually or embedded into a validating software/tool to achieve the required level of assurance and compliance.

In some embodiments, the blockchain use case is assessed using the blockchain risk framework. Based on the assessment results, the continuous validating software is then configured, operationalized, and implemented. After implementation of the software, managed services inclusive of ongoing risk assurance and IT support are provided.

The validation system may be a combination of services and software, designed for practitioners to provide transparency in meeting the assurance and compliance needs of users of blockchain-based data storage systems.

Figure 3:
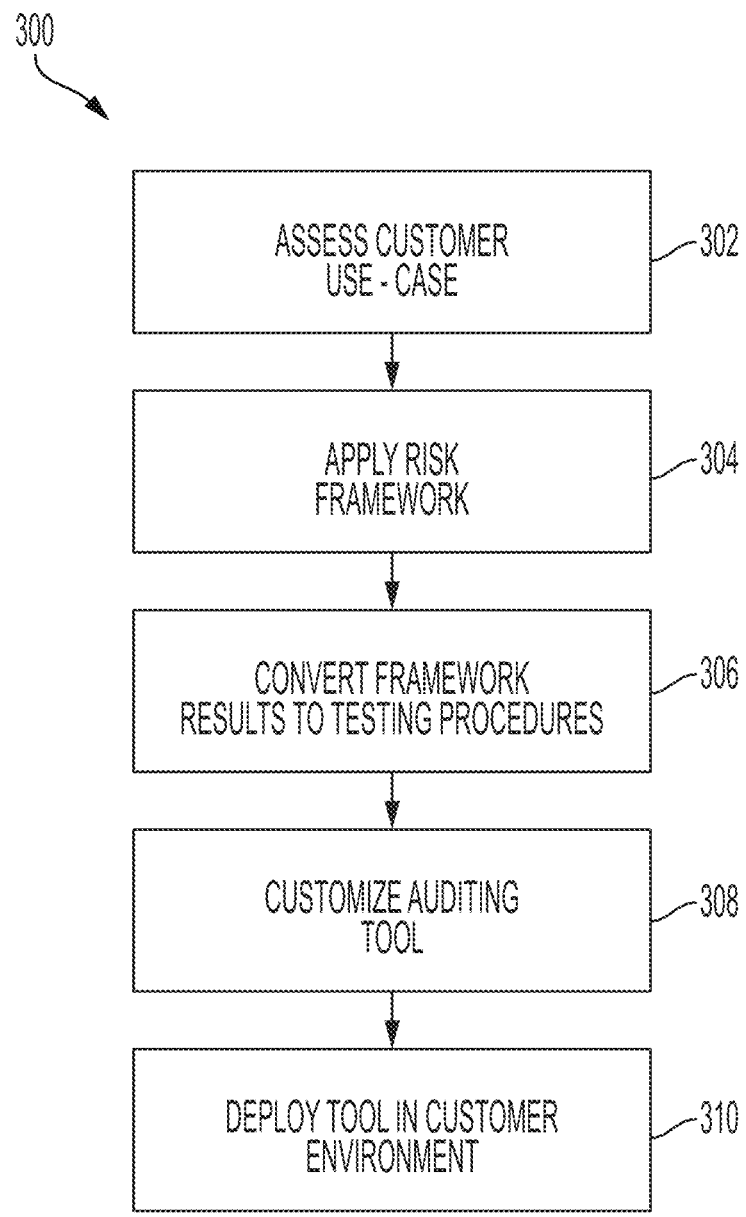
FIG. 3 illustrates an exemplary process for deploying a distributed ledger validation tool according to examples of the disclosure.

FIG. 3 illustrates an exemplary process for deploying a distributed ledger validation tool according to examples of the disclosure. In the example of FIG. 3, the process 300 can begin at step 302 wherein the customer's (who will be using the validation system) blockchain use-case is analyzed. The use-case analysis performed at step 302 can include as an example, determining the type of blockchain that is being used by the customer, analyzing how the customer is using the block chain to effect transactions and what solutions the blockchain is meant to deliver to the customer.

Once a use-case analysis is completed at step 302, the process can move to step 304, wherein a risk framework analysis is applied to the customer blockchain. A risk framework is a tool that can be used by stakeholders or auditors to assess and define the assurance and compliance needs of a particular blockchain use-case. The framework can allow the user to step through a series of categories of risks (i.e., risks to an organization engendered by their use of blockchain) to determine what risks they wish to audit for, and to determine the extent to which those risks would harm the organization. The risk framework described above can be industry, use-case, and blockchain technology agnostic so that practitioners across all industries and sectors can use to address the risk assurance and compliance needs independent of the Blockchain technology variant and use case.

Practitioners can use the risk framework as a standard approach and framework to evaluate the current state of a Blockchain use case which can be inclusive of upstream and downstream (on-Blockchain and off-Blockchain) processes, technologies, and underlying data elements (people, processes, technologies) against 6 different risk categories, applicable domains, and 100+ sub-risk categories in order to address assurance and compliance needs (risks, control objectives, controls, testing objectives and procedures, and reporting parameters) of the following stakeholders simultaneously or exclusively. The risk categories, domains and sub-risk categories can be used exclusively or mutually exclusively to determine targeted and/or upstream and downstream impacts. These parameters can be used to customize and personalize an assurance or auditing software/tool to achieve required level of assurance and compliance as by-product of processed transactions.

In one or more examples, the risk framework can include such categories as: governance and oversight of the blockchain, cybersecurity issues with the blockchain, infrastructure risks, blockchain architecture risks, operational risks, and transactional risks. As part of using the risk framework, a user can (via user interface) go over each risk category and the sub-categories within each risk category and indicate which risks are pertinent to their organization (or that they wish to be analyzed), and also indicate the degree and scope of those risks using the risk framework.

Once a user has engaged the risk framework at step 304 to identify the risks they want analyzed during an audit, the process can move to step 306 wherein the user-preferences supplied to the risk framework can be converted in to one or more testing procedures to be performed during the real-time compliance testing of the customer's blockchain. As will be described in further detail below, the testing procedures can then be used by the validation/auditing software to in real-time audit the blockchain.

Once the results from the risk framework are converted to testing procedures at step 306, the process can move to step 308, wherein the real-time auditing tool is customized using the results gleaned from the risk framework. In one or more examples, customizing the auditing tool can include setting up one or more testing procedures that the tool will engage in during its operation, and also setting up the formatting of the reports that the tool will ultimately produce for review by the customer (described in further detail below).

Finally, once the tool has been customized per based on the assessment of the use-case established at step 302 and the application of the risk framework at step 304, the process can move to step 310 wherein the tool is deployed in the customer environment. As will be described in further detail below, deploying the tool can refer to the creation of a validation node that becomes part of the customer blockchain environment. The validation node can be a read only node that includes the software to run the test procedures discussed with respect to step 306 on blockchain transactions as they occur in real time in the customer environment.

In one or more embodiments, the validation system created by the process described with respect to FIG. 3, may utilize a permanent planning file that can contain the details and results of the risk framework application, that can then be used at step 306 to convert the risk framework results into testing procedures. In other embodiments, the permanent planning file can instead be directly created by a user without the need to engage in the risk framework analysis above.

In some embodiments, the above set of activities of the validating methodology may be executed systematically (e.g., via software, hardware, or a combination thereof) with manual input by the auditor or compliance practitioner. In one or more examples, the validating methodology described above with respect to steps 302 may be divided into three phases (e.g., planning, fieldwork, and reporting sprints). The three phases are described below.

Planning Phase: In some embodiments, steps 302, 304, and 306 of FIG. 3 may constitute the planning phase. During the planning phase, an assessment is performed to identify validating test procedures using blockchain validating criteria and risk framework. In order to provide a required level of assurance for any given blockchain use case, a standardized acceptance criterion is developed to capture inputs and outputs and set the right assurance threshold level based on stakeholders' requirements, as needed. A blockchain risk framework can be used to identify inputs and define outputs in order to create the required level of assurance. Based on the assessment results obtained from using the criteria and risk framework of step 304, validity test and reporting parameters are determined (at step 306).

Fieldwork Phase: In some embodiments, step 308 and 310 of FIG. 3 may constitute the fieldwork phase. During the fieldwork phase, the validating software may be customized with the test and reporting parameters determined in the planning phase. Once the customized software is deployed at step 310, transactional information can be captured based on the defined data parameters and passed through a rules engine (described in further detail below), which can host the validity test rules. Practitioner uses the validity software to execute real-time evidence gathering and testing across a data activities-level data population set on a real-time basis (or some other interval if preferred, e.g., bi-monthly or monthly).

As will be described in further detail below, the software can classify testing results as either an observation (visual or virtual alert) when the rule breaks/fails, or a no-observation if the transaction passes the test rule with no breaks/fails. A practitioner classifies an observation as either an exception/deviation noted, or no exception/deviation noted. Further, the practitioner raises exception(s)/deviation(s) noted per test procedure as an issue, including exception/deviation details, investigation results, issue summaries and details, impact rankings and details, and management action plan details.

Reporting Phase: In some embodiments, step 310 of FIG. 3 may constitute the reporting phase. Once the validity tests and other fieldwork activities (i.e., exceptions/deviations and issues) are complete, the deployed tool can produce an issue and interim audit report, including ratings and details at the process and subprocess levels to achieve continuous reporting and monitoring (or some other interval if preferred, e.g., bi-monthly or monthly. In some embodiments, after the interim reporting cycle for the quarter (or some other interval if preferred) is complete, practitioner produces and issues a quarterly audit report including ratings and opinions at the process and subprocess levels to the stakeholders.

The testing and reporting can provide the required assurance level information at the process and subprocess levels based on the applicable risks, controls, testing objectives, and reporting parameters across the entire population data set to address stakeholders' needs.

In some embodiments, the exception can be replaced with the deviation in the flow described above to address the process and functional needs of the stakeholders in compliance or non-compliance areas (outside of audit).

In some embodiments, the validating methodology provides a practitioner with an end-to-end standardized audit process and sets of activities that can be used to obtain real-time transparency around given business processes (i.e., non-blockchain and blockchain) and provide compliance and audit-type reporting automatically or manually. In some embodiments, the methodology enables the practitioner to execute set of audit and compliance activities by the computer in a continuous fashion, which can bring a significant increase in efficiency and effectiveness, achieving a higher/maximum level of confidence.

In some embodiments, the blockchain validation tool/system is designed and developed to provide real-time transaction-level assurance with immediate results across a full population data set, which can be used by stakeholders and end-users simultaneously or exclusively to address their assurance, audit, and/or compliance needs. Some examples of stakeholders would be such personnel as the head of innovation, head of corporate development, chief technology officer, head of business segment(s), and chief audit executive. Some examples of end-users would be internal users (e.g., operations (first line of defense), enterprise risk management (second line of defense), internal audit (third line of defense), and tax); and external users (e.g., legal and regulatory).

One solution with separate customized views can satisfy multiple stakeholders'/organizations'/economic buyers' needs simultaneously. The solutions described herein can provide required assurance around processes and supporting systems built on distributed ledger technologies (DLTs). In some embodiments, as shown in FIG. 3, the results (i.e., testing procedures and parameters) of an assessment performed using a blockchain reliability assessment tool can be used to consolidate the audit and compliance activities into categories by nature of activity at the transaction layer, and embed them into validation software/tool/application. As will be described in further detail below, by drawing data from the underlying blockchain ledger, as well as from other upstream and downstream systems affecting the use case, any and all necessary audit or assurance-based procedures can be fully automated, and active transparency for them on a real-time basis (or some other interval if preferred) can be provided to the practitioner.

Figure 4:
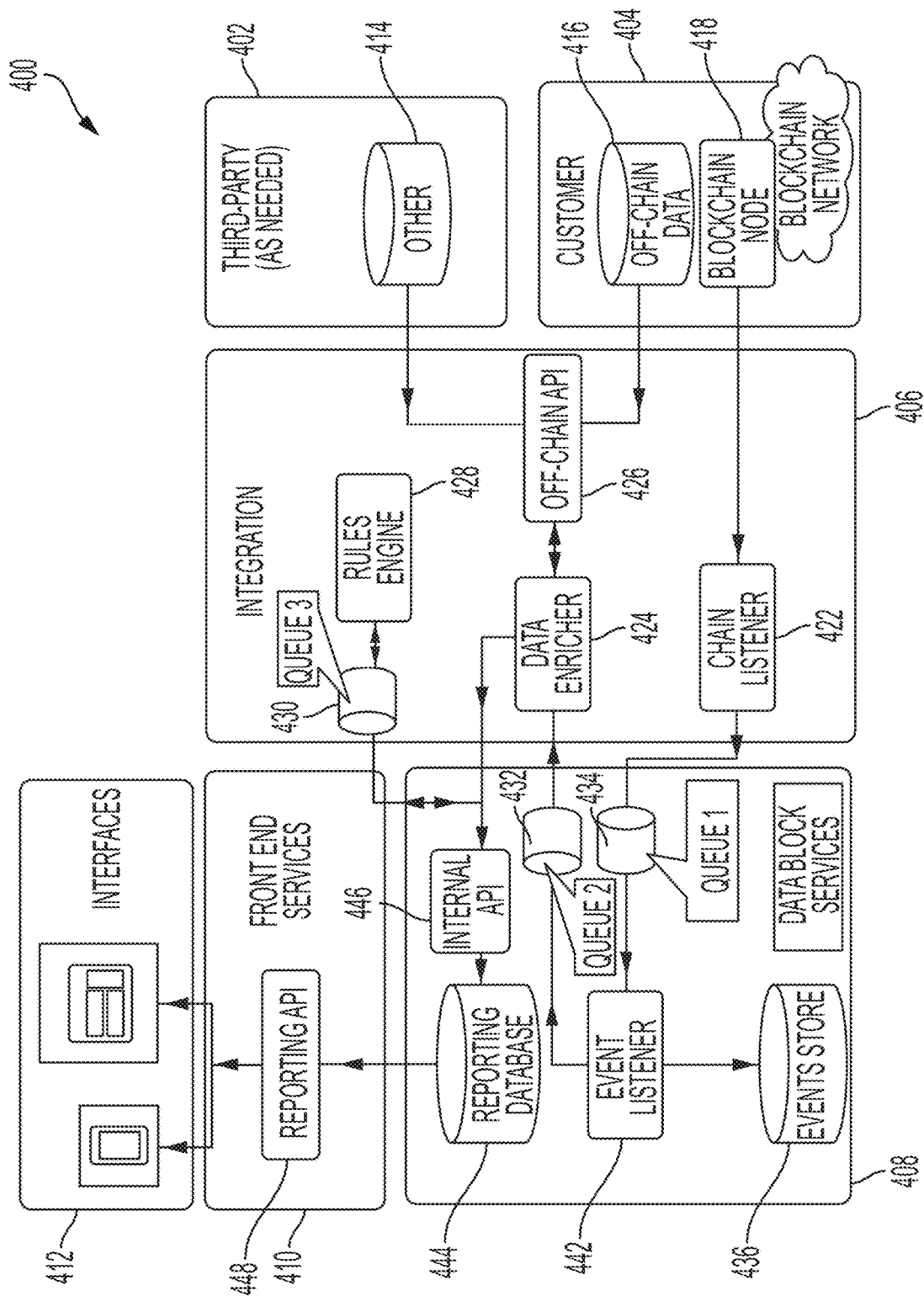
FIG. 4 illustrates an exemplary blockchain validation system according to examples of the disclosure.

FIG. 4 illustrates an exemplary blockchain validation system according to examples of the disclosure. The following discussion with reference to FIG. 4 outlines a structure to establish a validation node capable of performing real-time assurance off third-party blockchains. The validation system consists of individual microservices performing discrete pieces of functionality, which, when holistically viewed, can enable real-time assurance and validation of data activities in data blocks of blockchains in a blockchain network. The blockchain network may have a plurality of blockchain nodes having blockchain-based data storage systems in each blockchain node as described above with respect to FIG. 1. In some embodiments, the blockchain network and the blockchain node of FIG. 4 may be represented by the network and nodes shown in FIG. 1. The discussion below provides insight into the primary responsibilities of each service as a new blockchain event or data block is added to a node in the blockchain network.

Some assumptions in performing real-time assurance may include that: (1) off-chain data (i.e., data not stored within the blockchain) exists and may be required for key assurance reporting; (2) ordering, integrity, and completeness of data activities in a blockchain can be critical to assurance; (3) while the integrity of blockchain data can be validated, third-party "off-chain" data is not immutable and subject to change; and (4) assurance is being conducted on the qualitative and quantitative data activities of the blockchain, rather than the technical blockchain implementation (consensus protocols, block formation rules, blockchain forks, etc.).

The blockchain validation system may include major five components: (1) customer environment 404, (2) integration unit 406, (3) data block service unit 408, (4) front-end service or reporting unit 410, and (5) interfaces 412. In addition, the system 400 may interface with third-party computing systems (as indicated by block 402) as well as the customer blockchain 404. The following sections discuss these architectural components of the blockchain validation system (which may be referred to as the blockchain assurance and validation solution, blockchain assurance and validating software, or blockchain assurance solution) with reference to FIG. 4.

To illustrate the functionality of the components contained within system 400, a description of the data flow in the architecture of FIG. 4 can be pertinent. The process of validating blockchain transaction can begin with the addition of a new data block from one of the blockchain nodes 418 residing in the customer's blockchain environment. When a node 418 attempts to introduce new data into the blockchain, that activity can be sent to chain listener 422. The chain listener can serve as the initial integration point between the blockchain assurance and validation tool, and the customer blockchain. The goals of the chain listener can be to emit transactional blockchain events occurring within the blockchain. In most cases, blockchains provide varying levels of "feed" data in instances where generic events or transactions are published to subscribers of its services; in these cases, the chain listener can leverage those existing services to provide events for downstream service consumers.

Events trigger the initial action that results in a transaction or data activity (or the addition of a block) within the blockchain. Events should trigger one or more transactions within the blockchain, indicating that some key information should be delivered across the blockchain network. These transactions will manifest as a simple key-value pair, as illustrated below:

```
{
    //on the blockchain
    _id: 3199444, //a unique identifier
    dateTime: 2103323223 //unix timestamp,
        transaction; 2193298439843984381212211 //a transaction,
    sender: John Doe, //string
    receiver: Jane Doe, //string
    amount: 10 //integer
}
```

In most industry use-cases, blockchains will not actually store transactional data. The use of a shared ledger implies the likely scenario in which sensitive-data transactions occur. Moreover, storage costs can escalate, and blockchains are not intended to store items such as images, documents, etc. As such, an event transaction may have a simple encrypted "hash," which can contain a secret location that can be unencrypted by the asset owner. The same object described above can easily be represented as such:

```
{
    // on the blockchain
    _id: 3199444, //a unique identifier
    dateTime: 2103323223 //unix timestamp,
    hash: 2193298439843984381212211 //an encrypted value that
        could represent anything
}
{
    // off the blockchain (such as in a relational database).
    _id: 2193298439843984381212211,
    transaction; 2193298439843984381212211 //a transaction,
    sender: John Doe, //string
    receiver: Jane Doe, //string
    amount: 10 //integer
}
```

A "push" feed (built within the blockchain protocol) is the ideal setup, because it properly segregates the responsibilities across the blockchain network and the assessment and validating software. As such, it is up to the blockchain to provide guarantees that ensure transactions are emitted while the chain listener is responsible for relaying those events into the validation system. If this service is ever stopped or interrupted, it should possess enough awareness and understanding to resume starting with its last acknowledged transaction. This ensures that transactions are not "duplicated" within the environment and that unnecessary work to "reprocess" blockchain transactions will not occur.

Thus, once the chain listener detects that a new transaction is occurring on the blockchain, it can tag the event and send them to event listener 442 by placing the events onto a queue 434. The event listener 442 may then pick up the new data block from queue 434 and perform a series of tasks with the new data block acquired from queue 434. In one or more examples, the event listener 442 may store a copy of the new data block by storing in event store 436. The event store 436 can be the principal "record of truth" that represents a historical copy of the blockchain from which all downstream systems derive their system state. Records that live as unstructured data, and events transacted from the blockchain listener, will live as JSON objects within this document store (e.g., MongoDB), and will live in its nearest representation to data on the blockchain. The primary goals of the event store can be twofold: (1) separating querying and data, extraction responsibilities from the validation node (to avoid directly querying the blockchain for events); and (2) creating a consistent storage abstraction that can be leveraged regardless of the blockchain platform.

The event store can also enable additional capabilities such as data "snapshots," where events or transactions can be "replayed" as they occur. The event log provides a strong audit capability (e.g., accounting transactions are an event source for account balances) where historic states can be recreated by replaying past events.

Simultaneously to storing the event at event store 436, the event listener 442 can transmit the new data block to data enricher 424 by placing it into a queue 432. The data enricher 424 can take the data block stored at queue 432 and request information from external data sources (e.g., from a customer or third party) through the off-chain API 426 that collects third-party data stored at 414, and off-chain data stored at 416. External data sources can be centrally managed through the use of an off-chain API 426 that can federate requests to one or many external data sources such as third party data 414 or off-chain data 416. External data sources are centrally managed through the off-chain API 426, which federates requests to one or many external data sources. Off-chain data (sometimes referred to as oracles) provide, contextual information about blockchain data, including real-time data elements (e.g., stock prices), personally identifiable or sensitive information (e.g., names or addresses), or extraneous metadata, which could bloat the size of the blockchain ledger. Through the creation of its own independent service, the application reduces the tight coupling between internal and external application logic, and limits exposure to third-party systems.

Customer environment 404 which can store off-chain data 416, as well as third party data coming from data store 414 can describe the spectrum of tasks occurring within third-party networks and the original inception of the transaction, data activities, or data block onto the blockchain-based data storage system. While upstream (i.e., actions prior to hitting the blockchain) activities should be considered "out of scope" of the tool 400—need for assurance can require that examination occurs as close to the original "source of truth" as possible—it can therefore be essential for critical data elements or keys to exist within the blockchain, or else they will not be captured by the downstream processes. Careful design of blockchain metadata is needed to enable the ability for assurance and validation. Thus, customer environment 404 can collect and store various "off-chain" data at data store 416.

As an example of off-chain data, if a distributed ledger is storing emails being sent back and forth from the customer, the names associated with each email address could be an example of "off-chain data" that could be used to help validate and audit the blockchain itself. Thus, the type of data that while not needed for action block creation itself, may be needed to validate transactions occurring in real-time can be stored at data store 416. Off-chain storage contains data that is not readily available for public consumption. Off-chain storage may reference anything from trade data to vendor/sales information, or anything that provides context to the transactions inscribed on the block.

While blockchain data is historic and immutable, off-chain data is not immutable or immune to tampering. This makes logical sense: off-chain data will likely be sensitive, business-contextual data and will often be used by multiple consumers within an organization. The duplication of data across off-chain and on-chain data which poses consistency issues and the two are in-sync. It is possible that records reflected within the blockchain are not represented off-chain. Downstream processes will need to reflect this known hazard when they are working with off-chain data by properly rebuilding or reconstructing records that require updates to ensure the audit solution accurately reflects the historic state.

Once the data enricher 424 adds in the off-chain data, it can then transmit the augmented even to rules engine 428 via queue 430. Customer-specific business assurance rules can applied to the data block in the rules engine 424. Rules can be highly specific to the business and industry concerned and be customized according to each customer as described above with respect to the risk framework. Rules can the cornerstone of the validation solution, providing the basis of when/why transactions violate specified conditions.

The rules engine 428 can be implemented as a worker with a specified set of instructions on how to apply rules against transactions. Because the user interface also relies on the awareness and knowledge of rules, the rules engine can retrieve the latest inventory of rules from a shared database (not pictured). While this extra network request may seem unnecessary, it also can enable user-features such as the dynamic toggling of rules, the addition/subtraction of rules without hard resets, etc.

Two categories of rules may be applied to transactions or data activities in the blockchain: streaming rules that assess against individual transactions, and batch rules that assess against an aggregate of transactions.

Streaming Rules: Incoming transactions can be evaluated against a set of one or many business rules that can assess validity across a variety of dimensions (e.g., completeness of a transaction, blacklisting of specific values, application of transaction logic such as input=output, etc.).

Batch Rules: Incoming transactions that possess some relationship to historical or past events can leverage the event store to identify patterns that may violate assurance rules (e.g., aging transactions, number of transactions from an account, etc.).

These rules are generators of "observations" within the solution. Observations indicate the violation of a pre-defined guideline set by business or assurance rules, which Users of the system will evaluate within the web interface. As will be described in detail below, the observations can be collected and presented to a user, who can then review each observation and determine whether the observation warrants further scrutiny.

Once the rules engine 428 applies the one or more rules to the data block, the results of the tests performed by the rules engine can be sent to reporting database 444. Reporting database can store the results of the application of the rules to the data block.

The reporting DB is the final staging area where business-oriented data structures can be queried and analyzed. Any blockchain transaction saved within the event store will create one or many transactions within the reporting DB; this will allow a variety of views to be "staged" and immediately ready for analytics, assurance reports, etc.

In order to create this reporting state for user interfaces, any off-chain data must be already "enriched" and co-located with other blockchain events. The integration of off-chain and on-chain data will require a high degree of collaboration and integration between the third party and the tool.

Reliability and uptime of external systems can be unpredictable, and the present invention anticipates "offline" scenarios where external systems are unavailable. Moreover, the current state of the reporting DB can be off-sync with its original source of truth if records have been updated within the host system.

To resolve these issues, the architecture should incorporate several precautionary measures to ensure the reporting DB is in an accurate representation of its source of truth. In the "offline" scenario, worker jobs should fail, persist, and retry to ensure transactions are not lost. Additionally, periodic background validation jobs should have the ability to check the accuracy and updates of records. This integration has the potential to be complex, depending on the auditability and traceability of third-party systems.

The results stored in reporting database 444 can be sent to user interface 412 for further evaluation via reporting API 448. The reporting platform will be the sole interface through which users interact and communicate with blockchain data. A separate "reporting API" provides external users with access into data that has already been relayed, saved, and transformed into contextual and relevant pieces of information. This information is ready to be consumed by the web interface, which enables risk assurance professionals to make decisions according to real-time events on the blockchain.

The user interface presents the results of the test procedures to the rules engine. The user interface may be a web page, a web dashboard, a mobile device, or any other device that is configured to display or output the validation report.

In order to monitor the operation of the tool described with respect to FIG. 4, the tool can provide monitoring capabilities that allow a user to know that the tool is operating properly.

Figure 5:
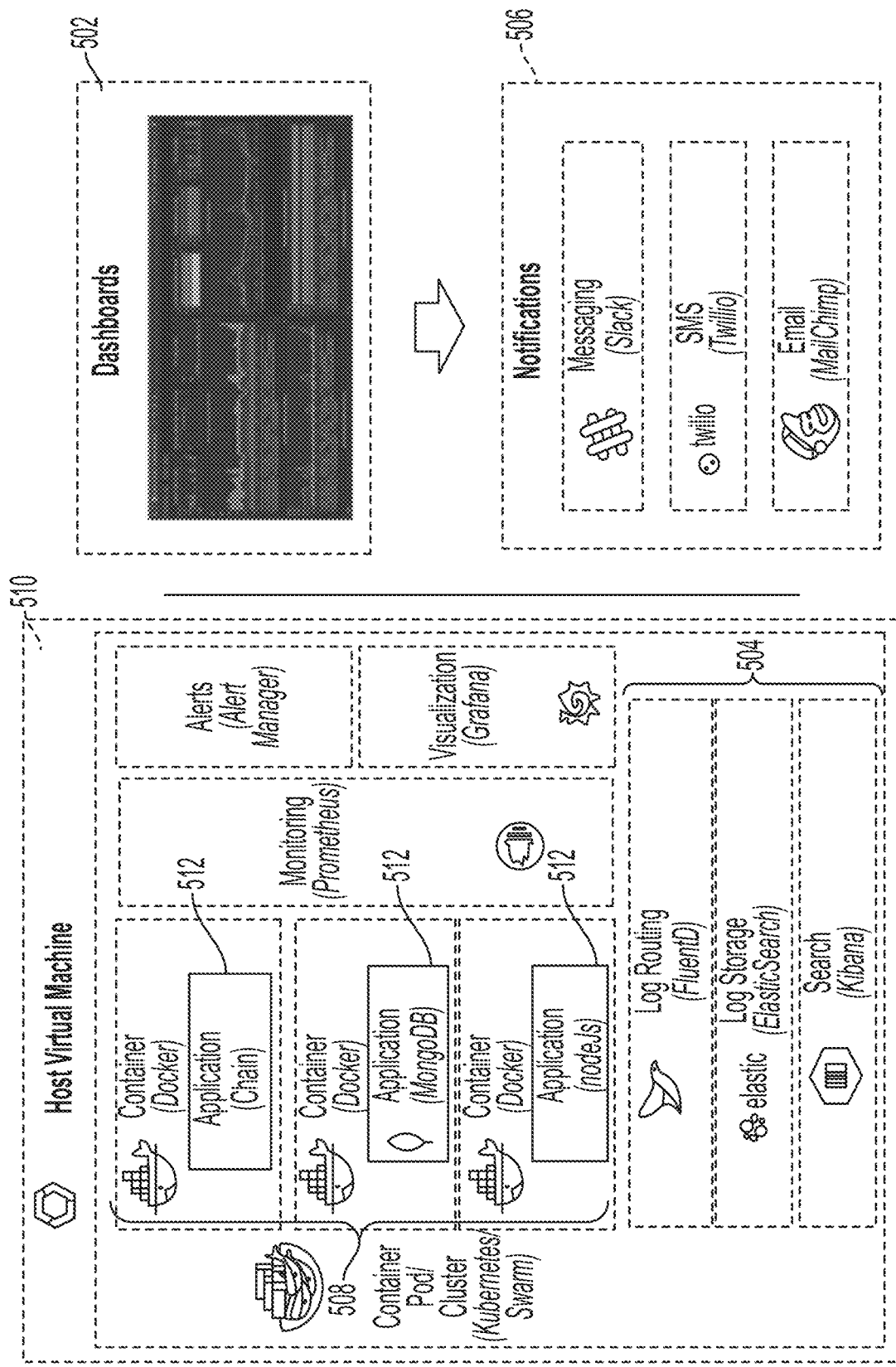
FIG. 5 illustrates a monitoring architecture for the validation tool according to examples of the disclosure.

Monitoring should occur throughout the system to provide the visibility, transparency, and understanding of vital signs throughout the application. FIG. 5 illustrates a monitoring architecture for the validation tool according to examples of the disclosure. The example of FIG. 5 illustrates the architecture for monitoring the application, the container hosts, and the underlying virtual machine. The goal of this architecture is to provide tooling sufficient to preemptively identify anomalies outside the threshold of normal behavior while providing the necessary tooling to drill down into issues as they occur. Monitoring may consist of the following components (FIG. 5):

Dashboards: Dashboards 502 can exist to communicate the key metrics and vital signs of each microservice described with respect to FIG. 4. Well-designed dashboards give developers an easy, visual way to detect anomalies and determine alerting thresholds. Key metrics should be captured at the host, application, and container levels:

Application Metrics report on the health status of individual microservices (e.g. containers or processes). Examples of application-level metrics include: endpoint successes/failures, response times, input/output, errors/exemptions, etc.

Container Metrics report on the health status of the instance(s) of containers running applications. Examples of container-level metrics include: CPU, RAM, processes, etc.

Host Metrics report on the health status of the underlying infrastructure and hardware supporting (e.g., server or VMs). Examples of host-level metrics include: total CPU, RAM, database connections, consumer threads, network requests, etc.

Logs: Logs 504 describe the internal state or status operations of an individual microservice. Each microservice should log the minimum necessary to describe key events or transactions. Transactions should have a consistent "request identifier" that flows throughout the application to identify. Logs enable system operators to home in on specific issues of transactions or events.

Notifications/Alerts: Notifications/alerts 506 communicate deviations from normal operations that warn of potential performance issues. Key metrics at the host, application, or microservice levels should have alerts set at various thresholds. Third-party integrations enable key personnel (developers, system operators, and other "tiered" support) to be either passively or actively notified upon the detection of issues.

Microservice architectures can rely on containers 508 to isolate individual runtimes and environments. Containers can be built from "images" that package together all necessary requirements, instructions, and commands to get a service working regardless of the operating environment.

Containers can be "stateless" and possess no knowledge of upstream or downstream events. This enables the blockchain continuous assurance and validation tool/application to address scalability concerns by growing horizontally (or adding additional computing resources) and load-balancing requests across those services.

The blockchain continuous assurance and validation tool/application relies on persistent data to maintain a "state" of individual services; store blockchain/off-blockchain and log data; and provide configuration information for services. To manage persistent data with docker containers, docker volumes are used to create a shared directory of data within the host system.

While no requirements have been provided for backups, there are several backup options, including backing up docker volumes and exporting them to a shared cloud storage, or backing up the entire disk of the VM.

The inherent components of the architecture shown in FIG. 5 support security best practices by isolating environments and limiting superfluous connections between services. Three primary surface areas of attack within the application are host, container, and application.

Host 510 is the virtual machine providing computing resources. The microservices environment is cloud-agnostic and can be hosted across any variety of cloud infrastructure providers through hosted computers (i.e., virtual machines) or container-as-a-service platforms. Cloud infrastructure, such as the Google cloud platform, provides encryption of data at rest by default. Security rules at the network/firewall level also enable flexible access control between host-to-host communication.

It is expected that a single-host environment will allow network traffic from the internet to serve web content. Authorization/authentication services within the application are implemented.

The only installation requirement for all host is to support Docker. There are a variety of tools such as Docker Toolbox, which can provide automated checks across a variety of domains to ensure a secured network environment.

Containers 508 are the isolated environments living within a container network. Containers are "secure by default" and provide an isolated environment wherein code can run without potential interference from the host or other containers. Unless specified (by exposing ports or mounting volumes), containers cannot communicate with any environment unless it is living within the same network. Docker enables users to create custom virtual networks to isolate working environments where communication should occur. Individual networks for each container-to-container communication are created. This architecture ensures "less-possible-privilege" for each service and greatly reduces the number of connection points and therefore the possibility of unauthorized access.

An application 512 is the source code living within each container. Docker images are built by bundling all the known components (e.g., operating system, runtime environments, source code, etc.) to run an application into an isolated environment. These images, once built, are immutable and provide a consistent understanding of "state" within the container.

Docker images are built by inheriting a previous "base" image from which to begin. For example, images commonly inherit an initial lightweight Linux working environment (e.g., Alpine, Debian, etc.) from which to begin building. These images are often provided by authorized "owners" of the software, but these owners can also be community, maintained. The scanning of Docker images will provide a heightened level of security that will evaluate each "layer" of a Docker image and ensure no known threats exist, although this tool would be separately integrated.

The blockchain continuous assurance and validation tool/application leverages a variety of open-source technologies for development that are fetched from community-maintained external registries. To facilitate this communication, developers rely on "package" managers such as NPM and Yarn for NodeJS to retrieve pre-built libraries hosted elsewhere on the Internet. This exposes potential vulnerabilities, as unauthorized changes could inadvertently be pulled through routine development/deployment.

These risks can be mitigated by ingraining automatic "security checks" into the continuous integration/continuous delivery pipeline. For example, the Node Security Platform is a tool for flagging known risks/vulnerabilities by the community. This tool, among others, can be run during the build/test process to flag any potential vulnerabilities; any commit pushed by developers that fails these basic security tests will be marked as a "FAILING" build.

To ensure applications can be recovered, restored, and repaired, blockchain continuous assurance and validation tool/application employs most principles found within twelve factor applications. Specifically, the automated deployment pipeline ensures developers can conduct rapid deployments with minimal production risk. The development pipeline can be summarized as follows:

Source code is managed through a privately hosted instance of Gitlab.

Upon commit, Jenkins instance manages the build/testing process, which will also produce suitable Docker images for deployment.

Gitlab Registry manages the version control of individual Docker images tagged, and perform "hot swaps" of containers.

Ansible performs automated deployments on successful builds.

The ability of the blockchain continuous assurance and validation tool/application to perform its intended function relies on the underlying host machine, the docker container, and the current health of the application. Proactive monitoring and alerting mitigates the potential for system-wide issues to cause the blockchain assurance solution to fail.

Container management tools (e.g., Docker Swarm, Kubernetes, Mesos, etc.) provide the scheduling and orchestration of containers, enabling the replication of containers across multiple nodes. These tools can perform health checks by assessing the "liveliness" of the application via HTTP pings or executing probing commands, and provide rolling deployments to perform "zero-downtime" version releases.

Figure 6:
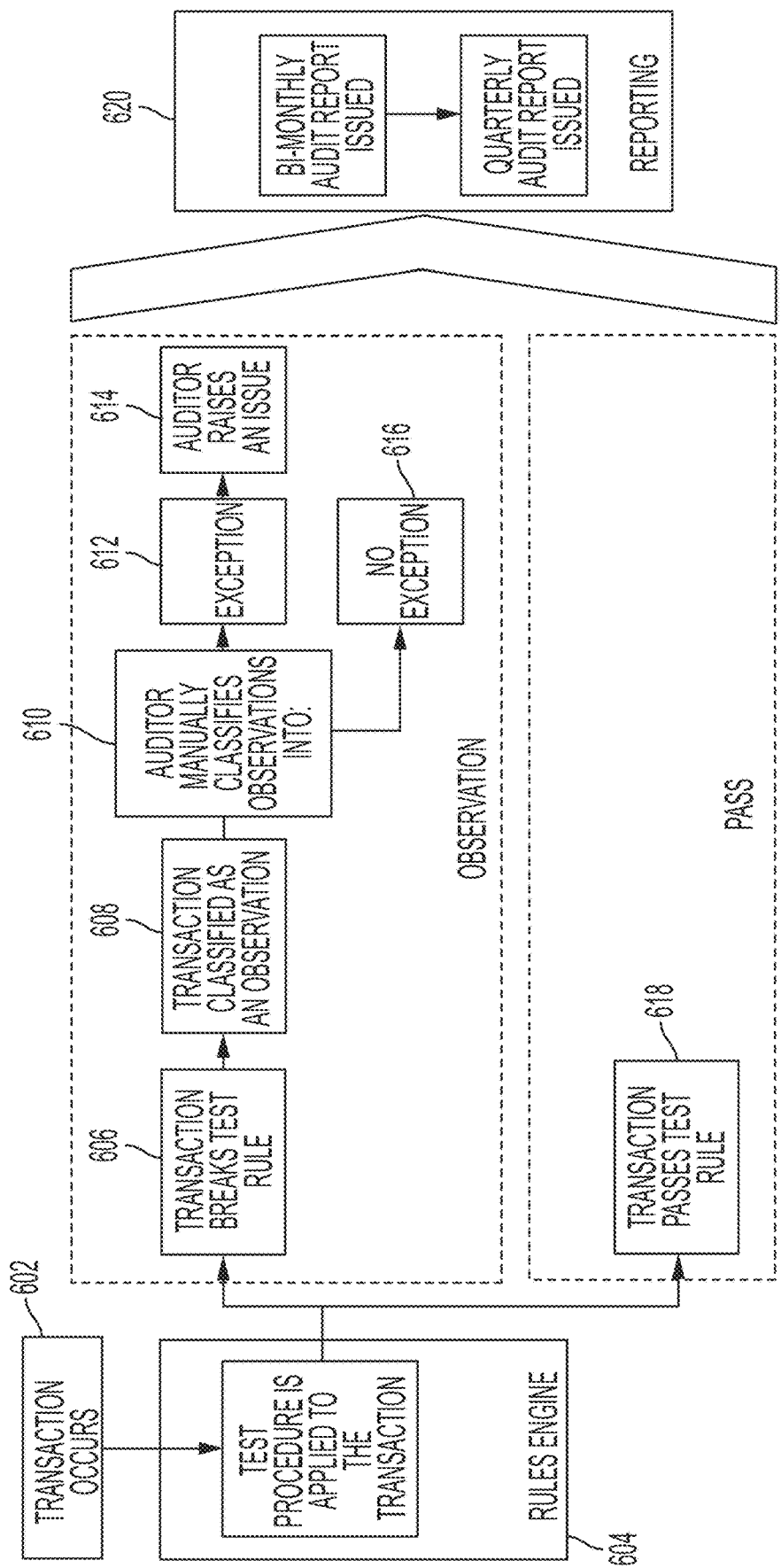
FIG. 6 illustrates an exemplary validation process according to examples of the disclosure.

Returning to the example of FIG. 4, the system 400 described therein can be part of a larger real-time block chain validation process that ultimately generates reports that a customer can use to validate/audit their blockchain architecture. FIG. 6 illustrates an exemplary validation process according to examples of the disclosure. The process described in FIG. 6 can illustrate how the system described with respect to FIG. 4 operates in the larger context of validation.

The process can begin at step 602 wherein a blockchain transaction occurs. Once a transaction occurs at step 602, the process can move to step 604 wherein one or more test procedures are applied to the test transaction in the manner described with respect to FIG. 4.

As discussed with respect to FIG. 4, the system can determine whether or not the transaction being analyzed complies with one or more rules/tests and can either produce a passing result or a fail. In the event that the transaction under scrutiny passes all of the tests, the process can move to step 618 wherein the result is passed directly to the reporting database and ultimately published in the reports 620.

However, if one or more tests applied at step 604 yields a failing result, the process can move to step 606 wherein the wherein the result is sent onward for further remediation. At step 608, the transaction that has broken one or more rules can be classified as an observation. Observations indicate the violation of a pre-defined guideline set by business or assurance rules, which Users of the system will evaluate within the web interface.

Once the transaction is classified at step 608, the process can move to step 610 wherein an auditor can manually review the observation and classify it as either being an exception or not an exception. In one or more examples, the auditor can perform the manual review of step 610 via a graphical user interface on a computer, wherein they read the information associated with the exception on a computer display, and then provide an input to the computing system (via a keyboard or mouse for example) to indicate whether the observation should be classified as an exception or no exception.

An exception can refer to an observation that the auditor believes constitutes signs that there is an issue with the blockchain environment that needs further scrutiny. Thus if an observation is classified as an exception at step 612, the process can move to step 614 wherein the auditor raises an issue that is then transmitted to the reporting at step 620.

In the case of designating an event as "no exception" at step 616, the auditor can decide that the observation does not need further scrutiny and is not an issue.

In order to understand the functionality of FIGS. 4 and 6 an example use case is provided below. Assume that a testing periods last for half a month. During this time, the automated rules are flagging transactions (or groups of transactions) as observations, noting whether they're worthy of investigation. The reporting period begins the day after a testing period ends. The reporting period lasts for half a month, during which all observations must be classified as "exception noted" or "no exception noted." Once all observations have been classified, the bimonthly report can be finalized. Once all six reports for a quarter have been finalized, a quarterly opinion can be provided.

Emad Khan is a CAE at Nasdaq and has established a reputation for being very meticulous with his reports. He wants to make sure that all of the exceptions are accounted for and that he has full visibility across the current status of real-time testing, current bimonthly reporting period, and quarterly audit opinion processes.

His current team consists of Constantine Thornes, an analyst who works closely with his manager, Ian McGrawhill. Constantine's main task is to mark observations as "exceptions" or "no exceptions." On the other hand, Ian's task is to close off issues, finalize the bimonthly report, and assist Emad in creating the audit opinion at the end of the quarter.

We will follow their actions as they complete their tasks. Each process below is accessible to certain users, who are listed below.

1) [Constantine, Analyst] Mark observations as exceptions on current bimonthly report.

2) [Constantine, Analyst] Mark observations on real-time testing activity.

3) [Ian, Manager] Identify and finalize issues per exception identified, and finalize bimonthly report.

4) [Emad, CAE] Fill in and finalize quarterly report.

5) [All Users] View previous bimonthly report and quarterly audit opinion.

1) Mark observations as exceptions

Constantine's main task is to mark observations as exception "noted" or "no exception" noted for each test procedure under each subprocess on the current bimonthly report. The process is as follows:

Constantine will be directed back to the dashboard, where he can continue his task until all sub-process test-procedure observations are completely marked as "exceptions" or "no exceptions."

2) Real-time testing activity

Once Constantine completely marks all observations on the current bimonthly reporting period, he can view the real-time testing activity dashboard, which shows how many observations have been identified per test procedure. He also has the option to click on each test procedure and start classifying each observation as "exceptions" or "no exception."

3) Identify and finalize issues per exception identified, and finalize bimonthly report Ian can work with his team in identifying all observations. Once all sub-process observations are marked, he will see the "+" sign next to each test procedure. This indicates that there are issues he needs to classify.

Once Ian identifies all issues, each test procedure with a green icon will indicate that the issue has been classified. Once all issues have been classified, the "finalize bimonthly report" button shows up. Ian can now finalize the bimonthly report.

Once all issues have been identified, the "+" sign will turn green, indicating that all issues have been finalized.

4) Fill in and finalize quarterly report

On the last bimonthly report of the quarter, once Ian finalizes the last bimonthly report, he will be directed back to the dashboard, where the "finalize quarter [x] report" button will appear.

5) View previous bimonthly report and quarterly audit opinion

Users can click on the tab at the top to view previously finalized bimonthly report or quarterly audit opinions.

Figure 7A:
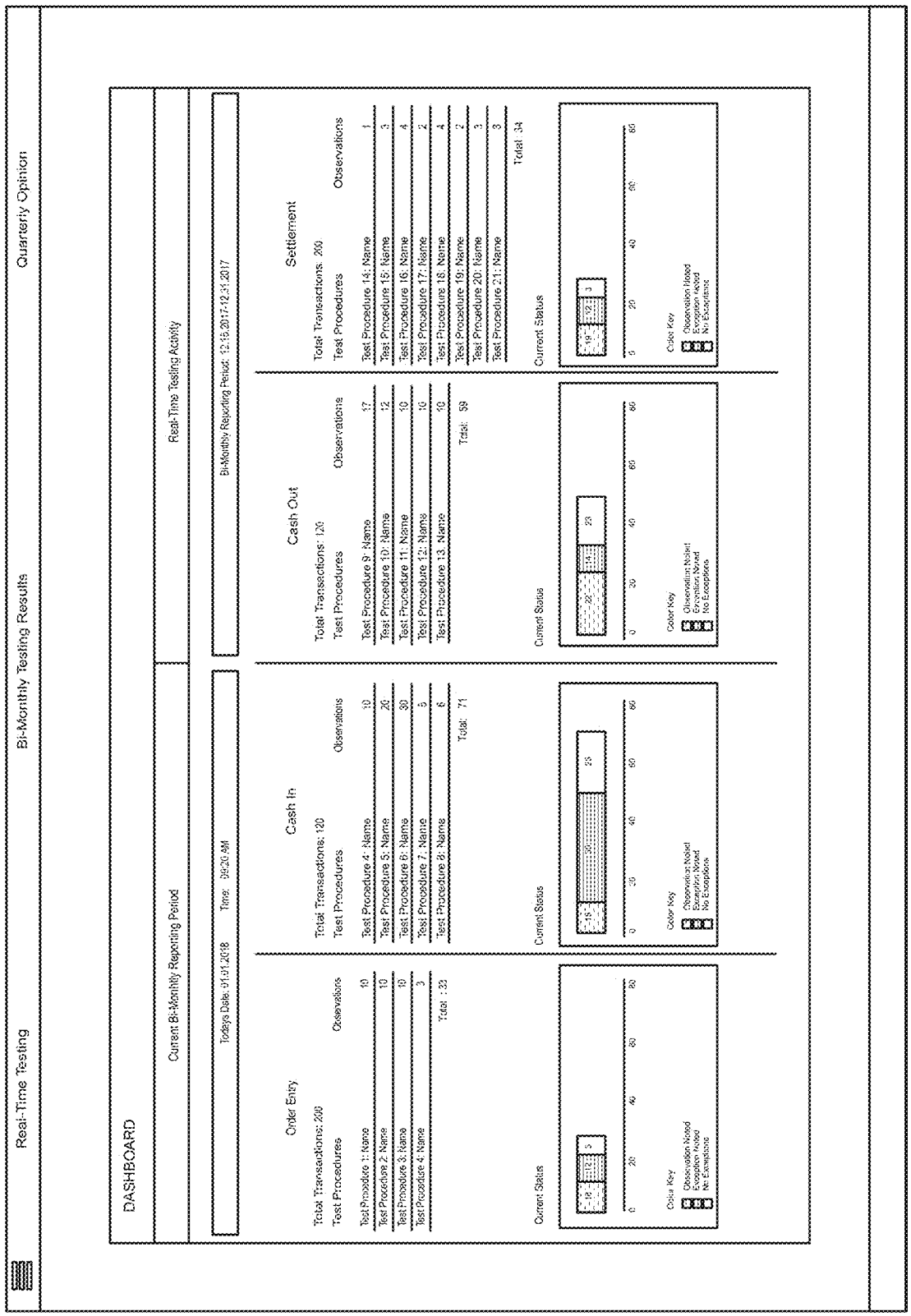
Figure 7F:
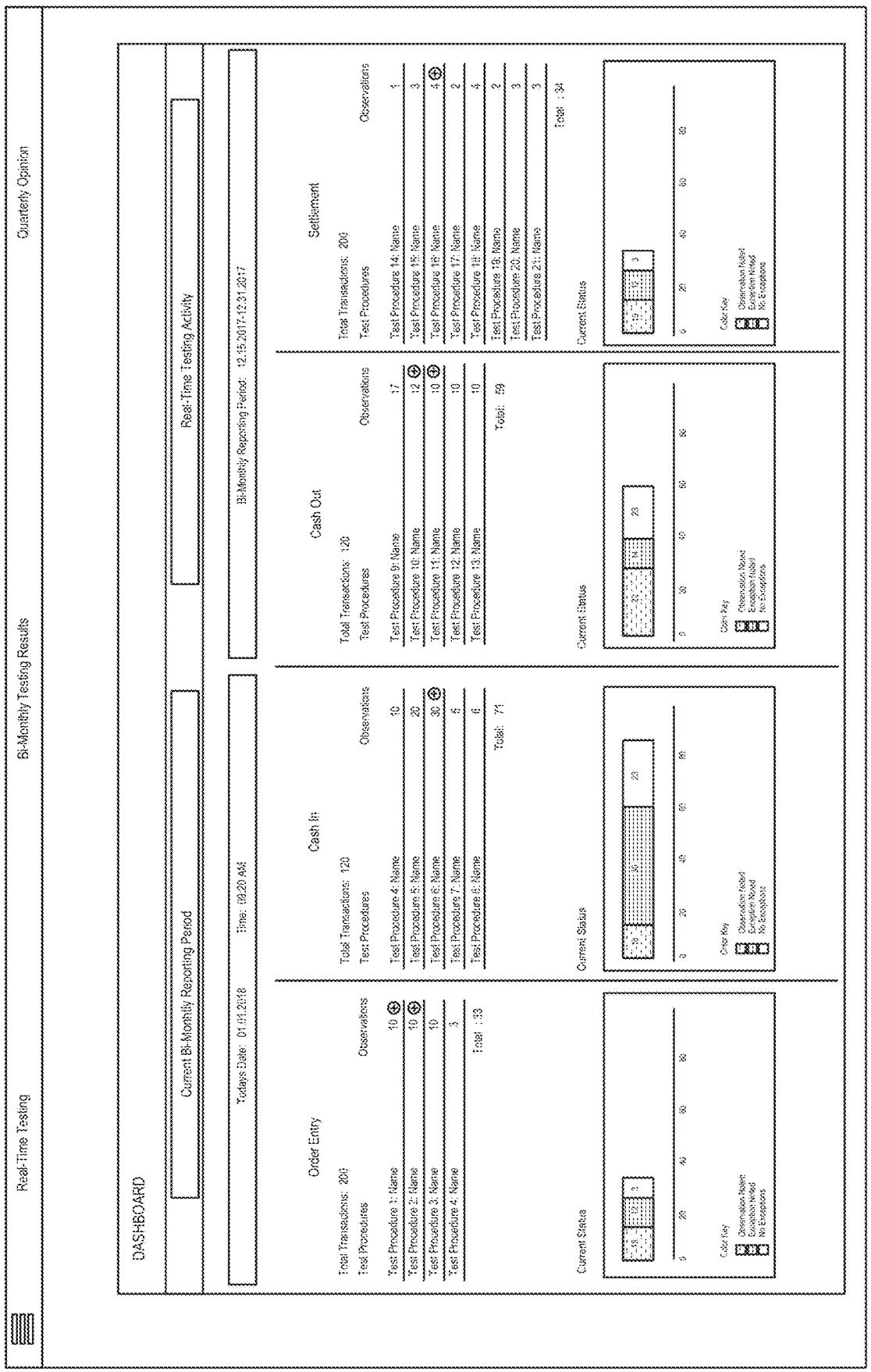
Figures 2, 7M:
Figure 7B:
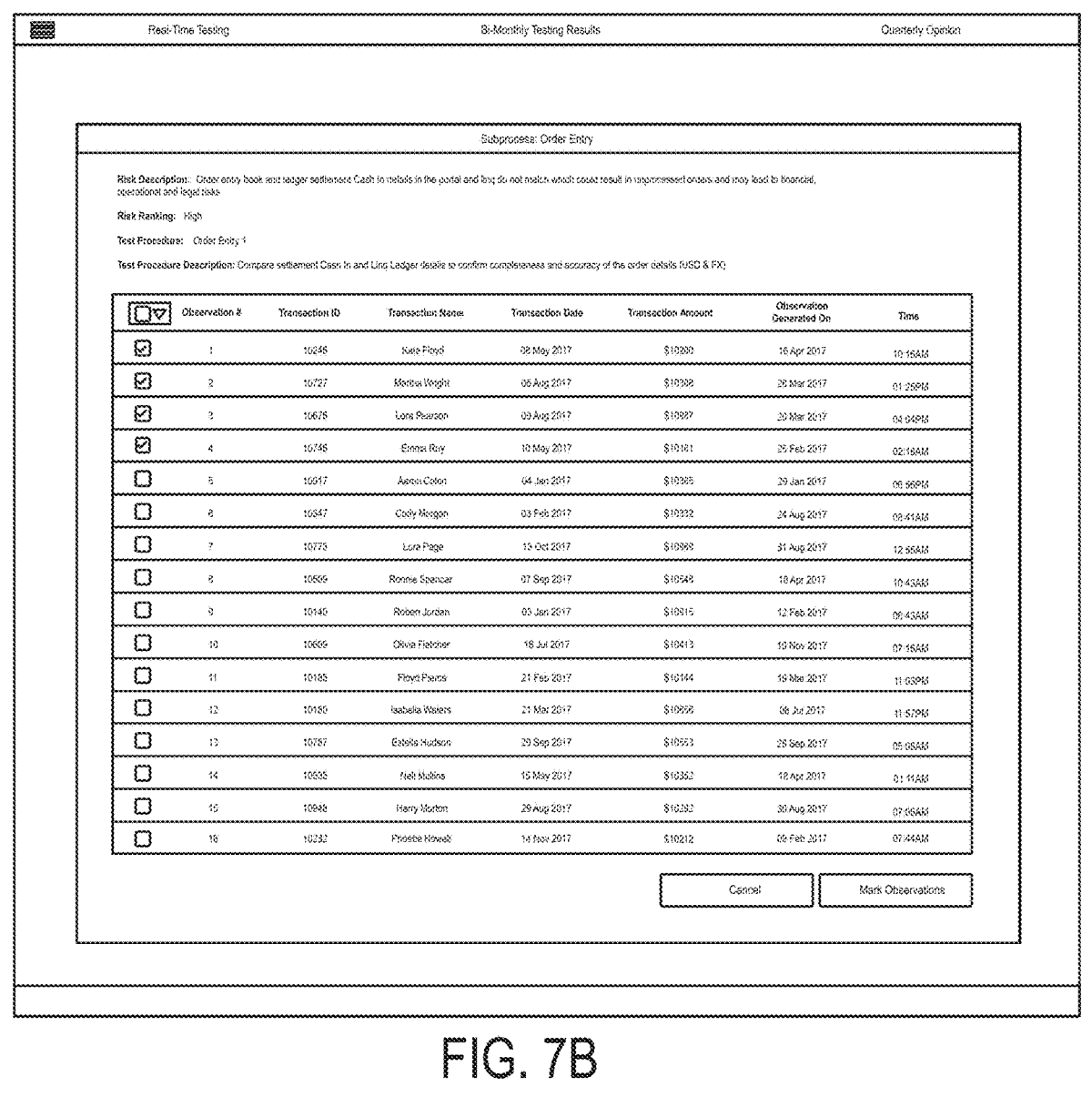
Figure 7C:
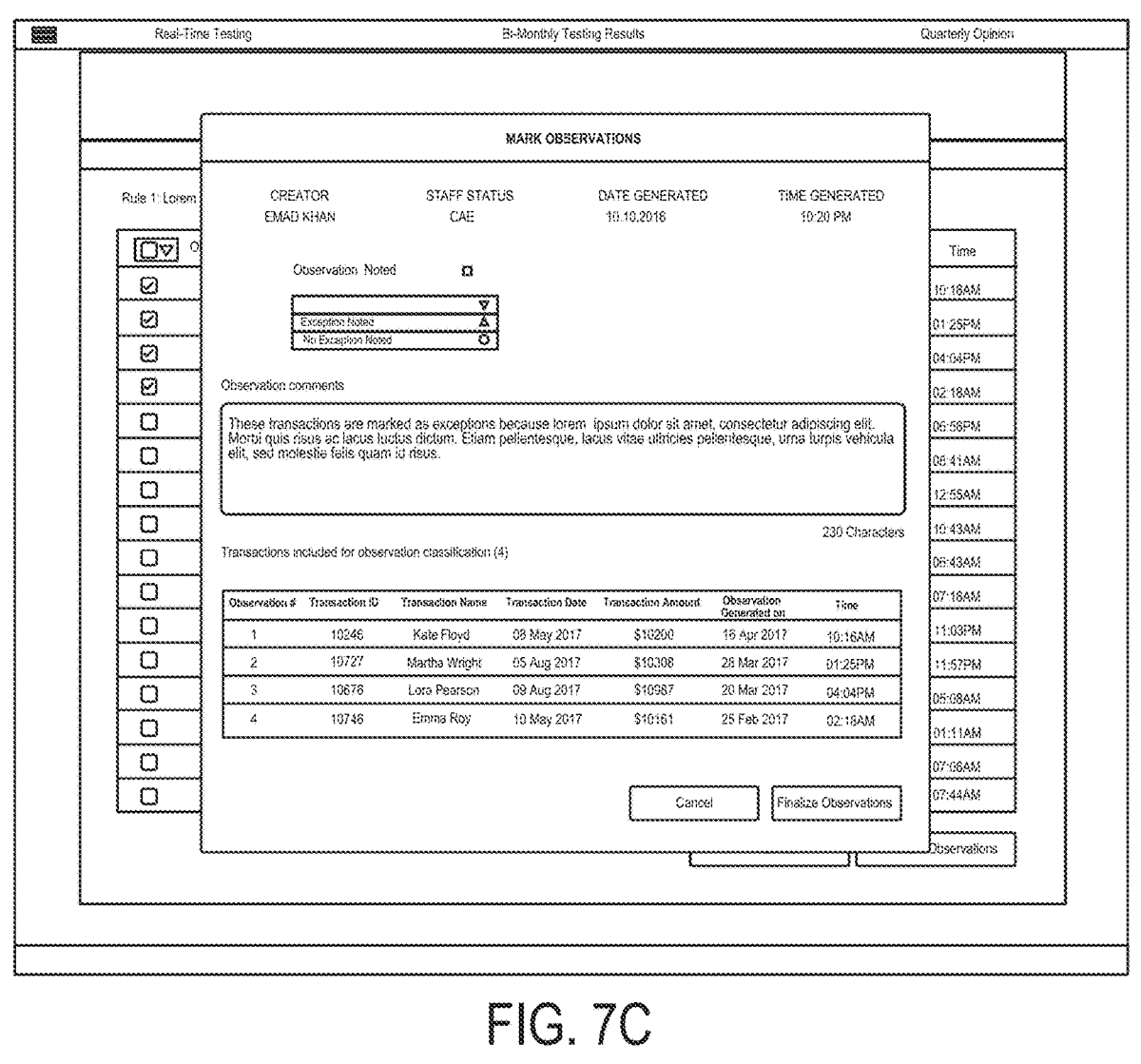
Figure 7D:
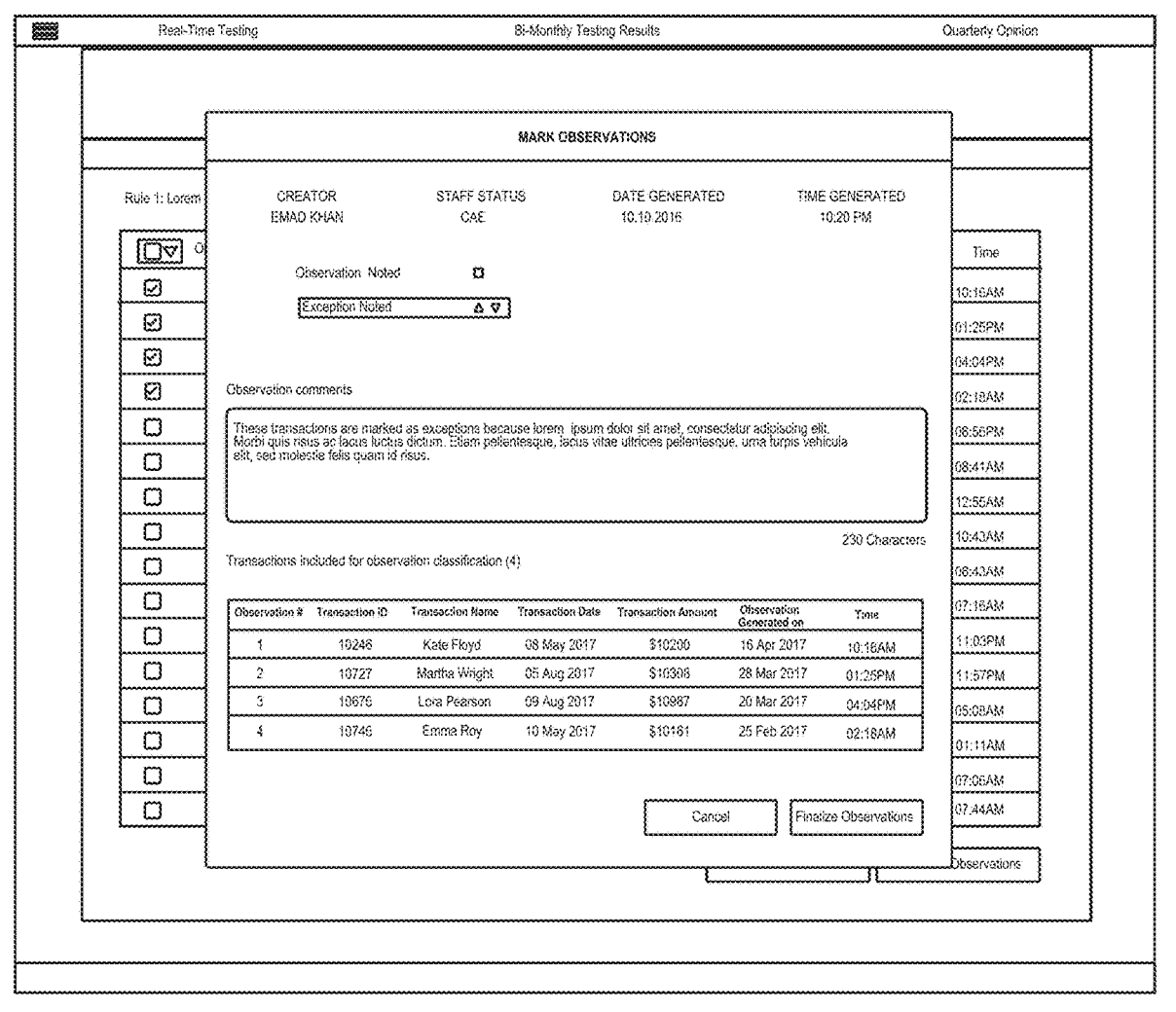
Figure 7E:
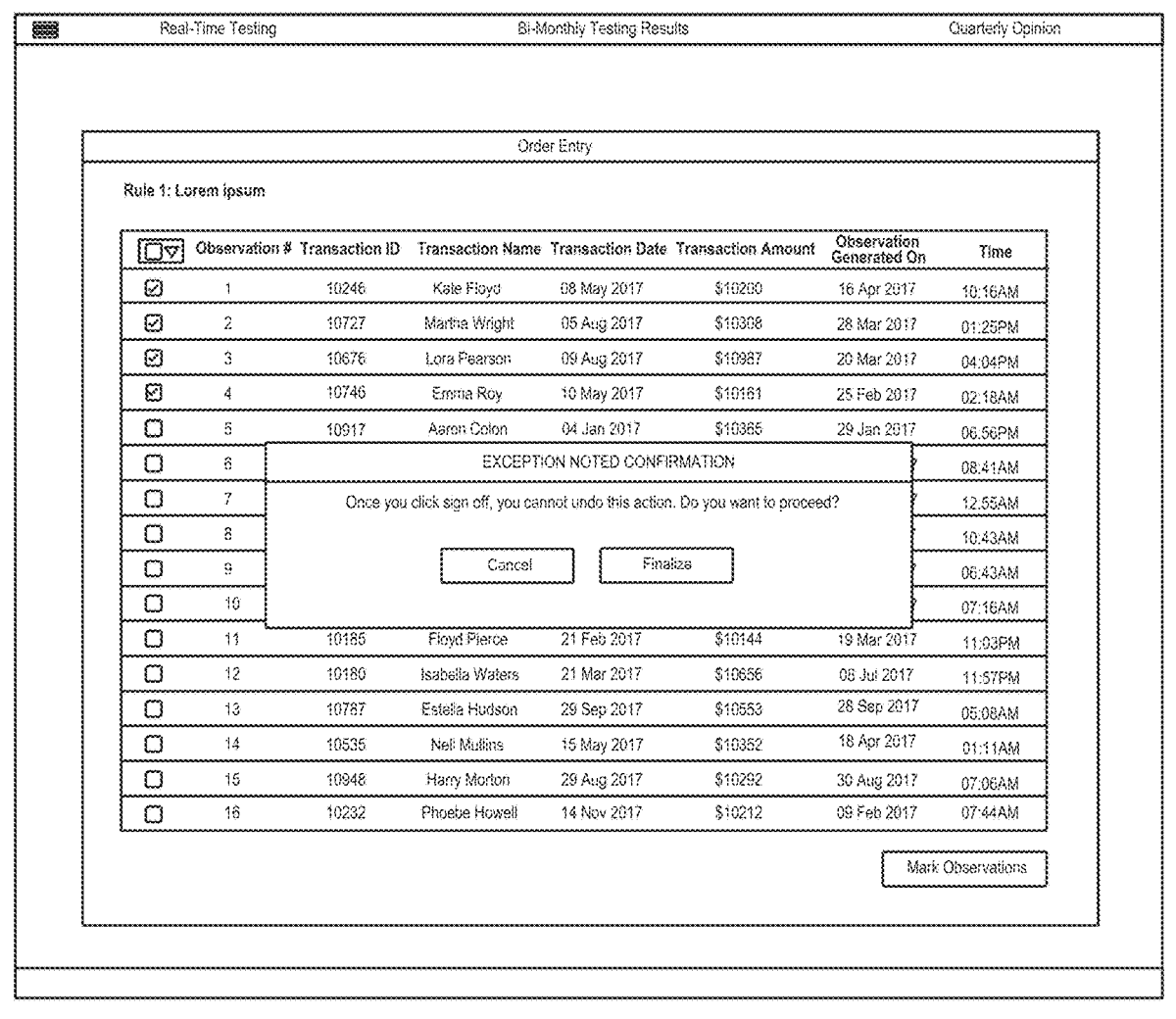
Figure 7G:
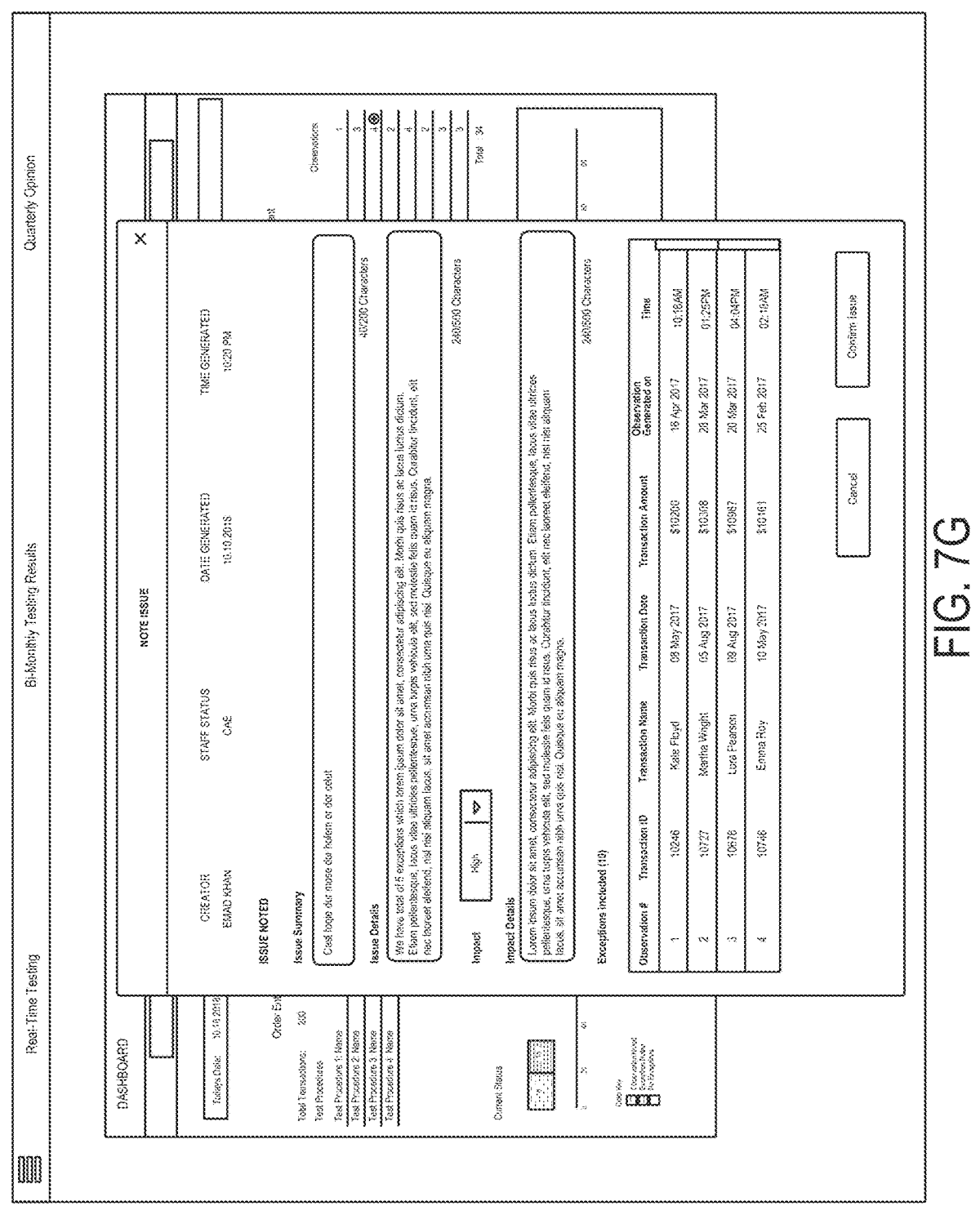
Figure 7I:
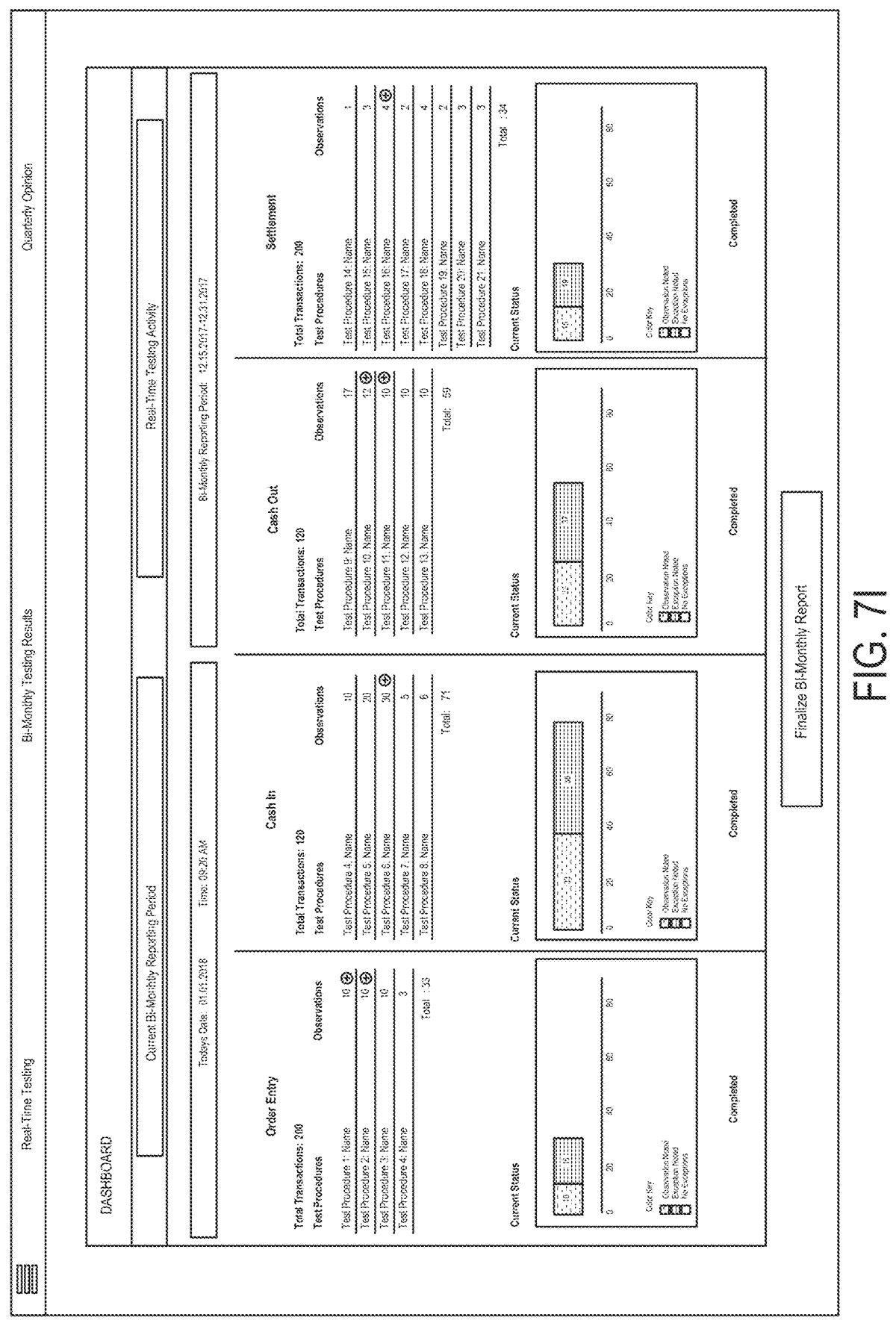
Figure 7J:
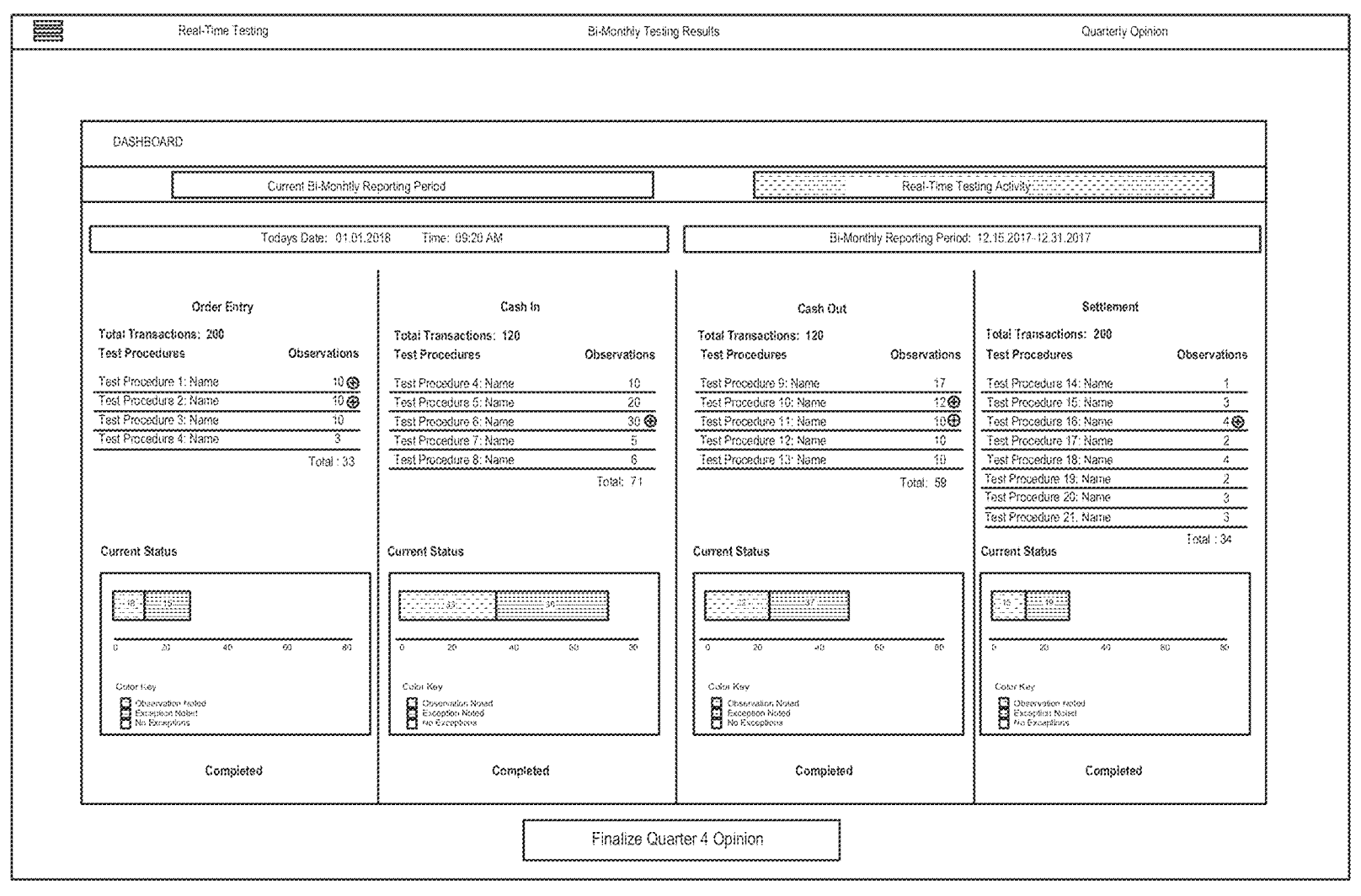
Figure 7K-1:
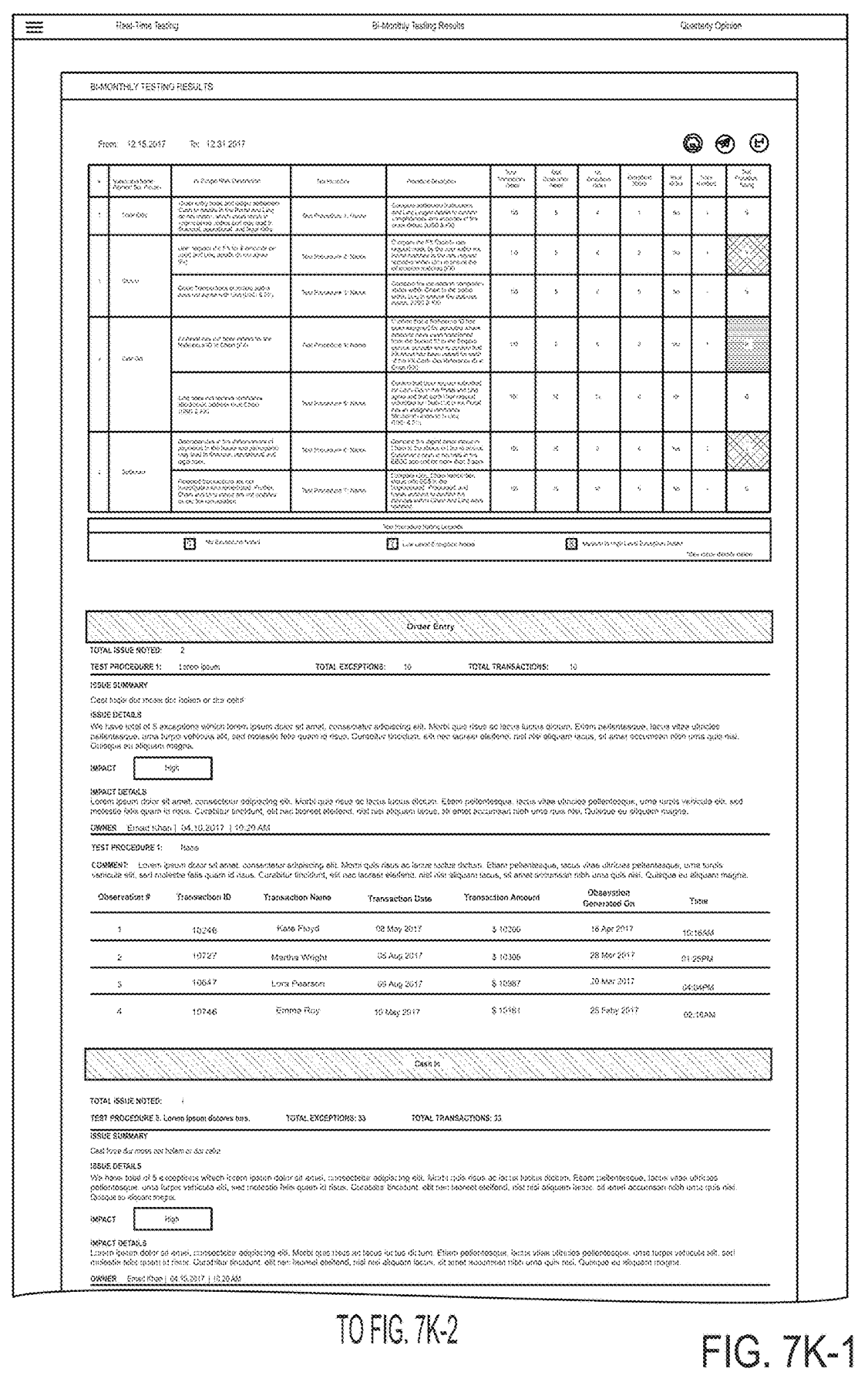
Figure 7K-2:
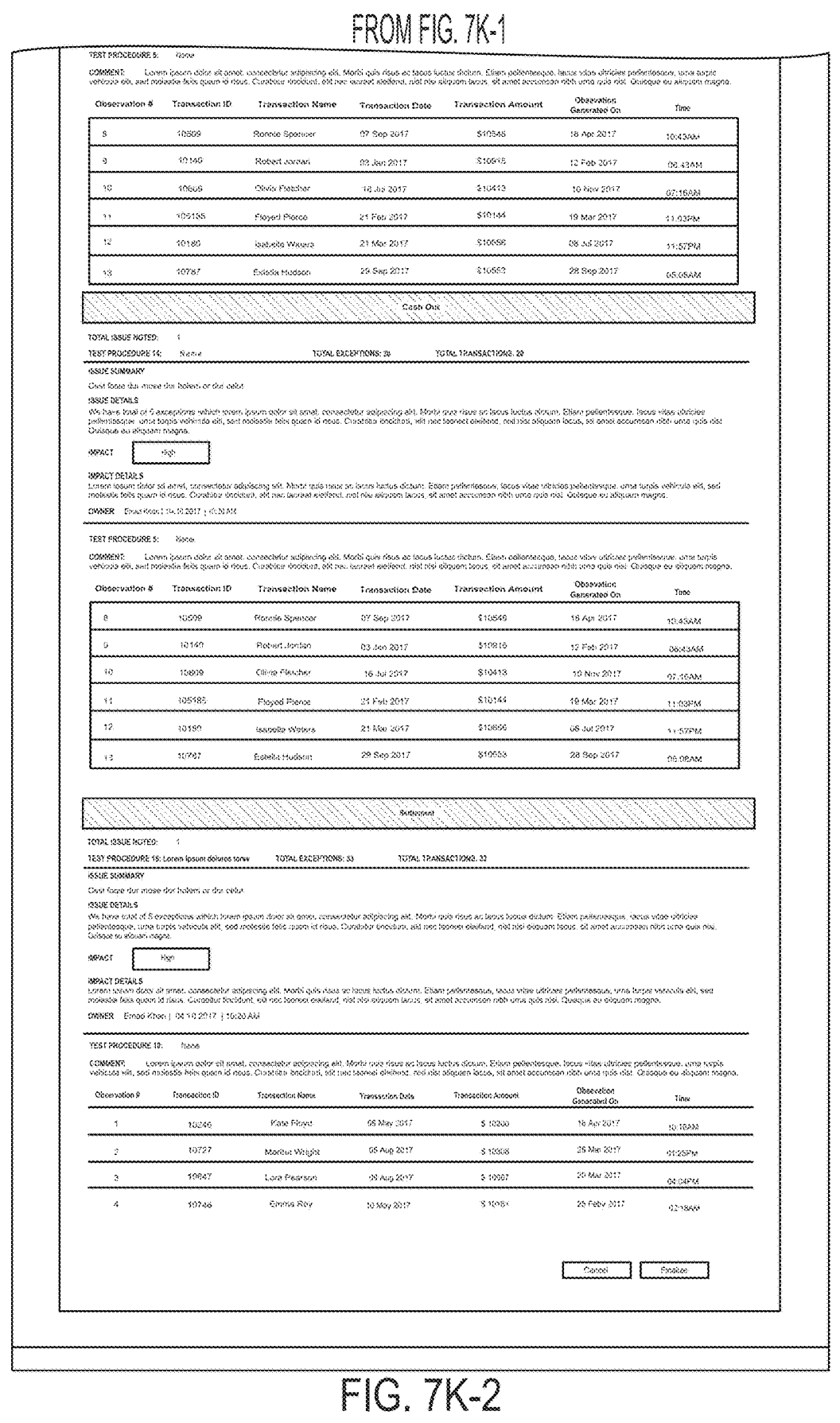
Figure 7L-1:
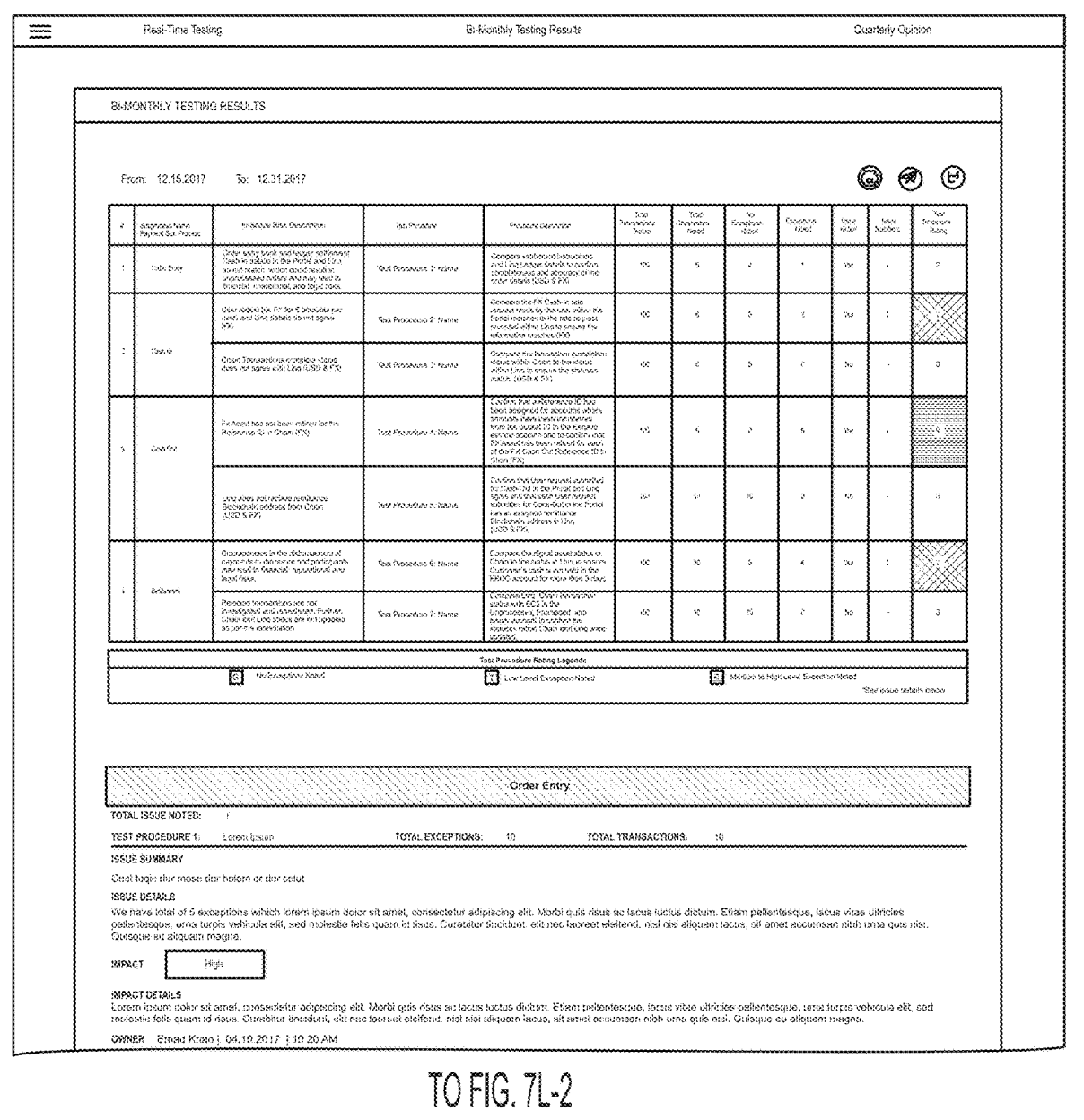
Figure 7L-2:
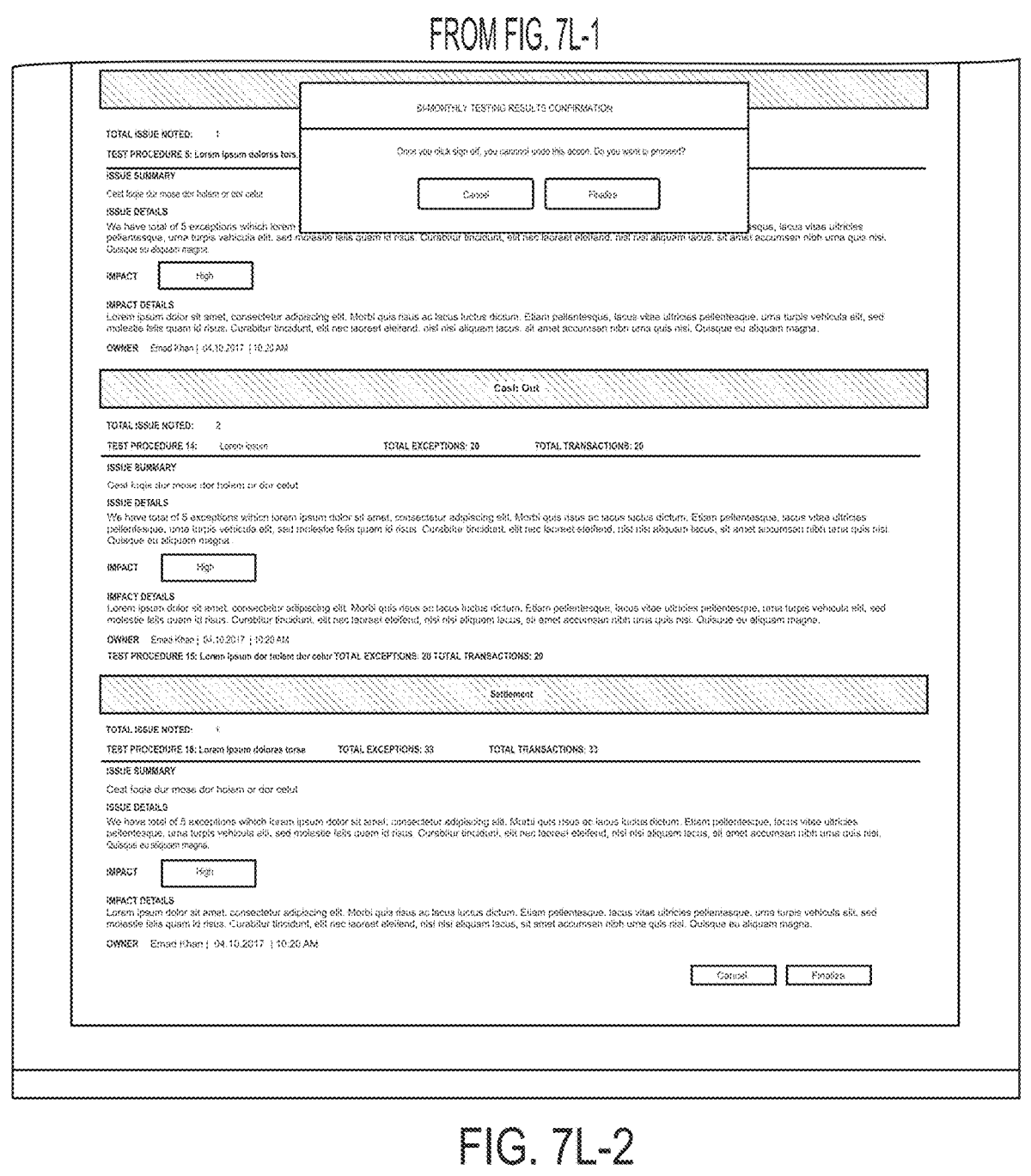
Figure 7M-1:
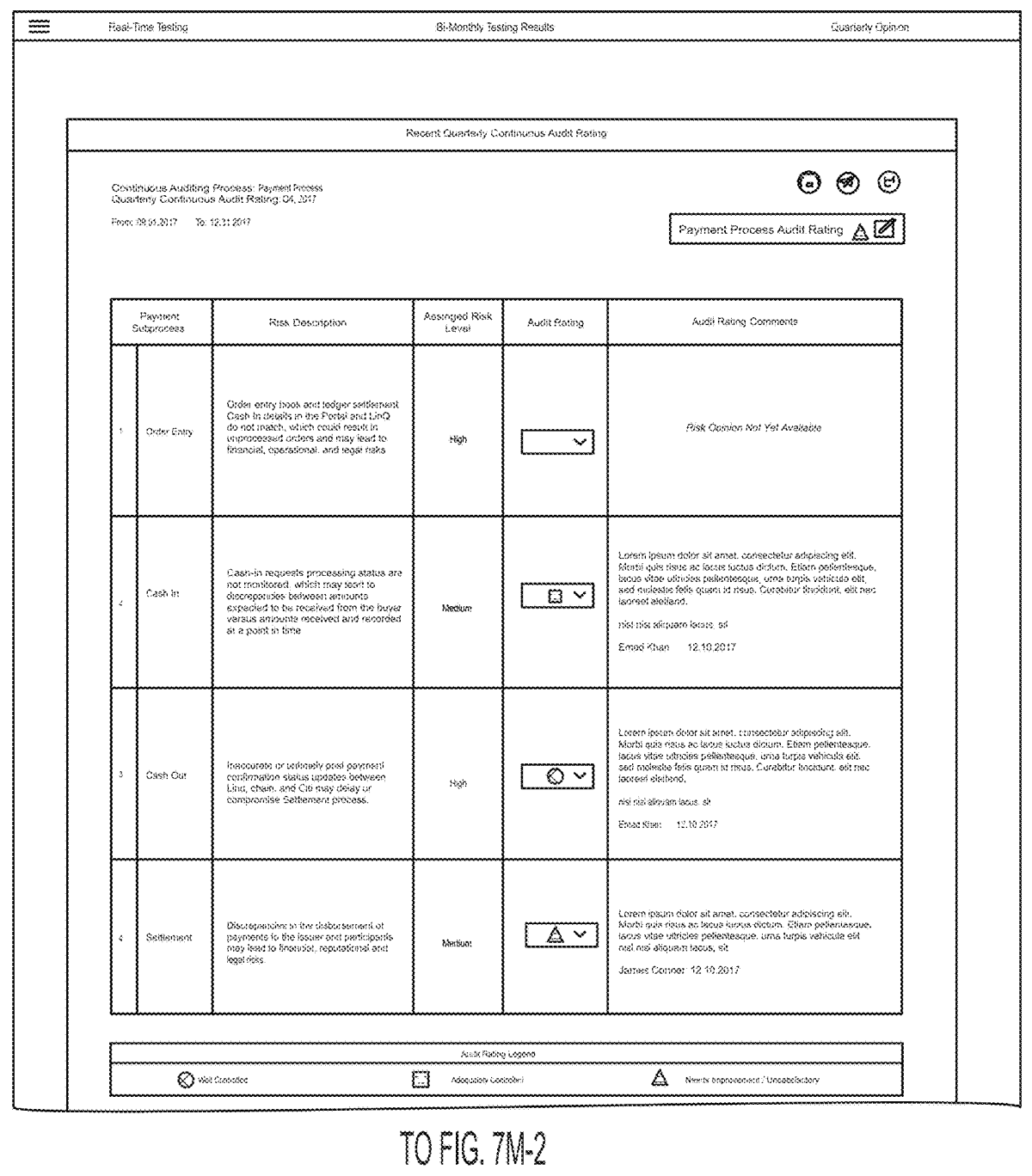
Figure 7N-1:
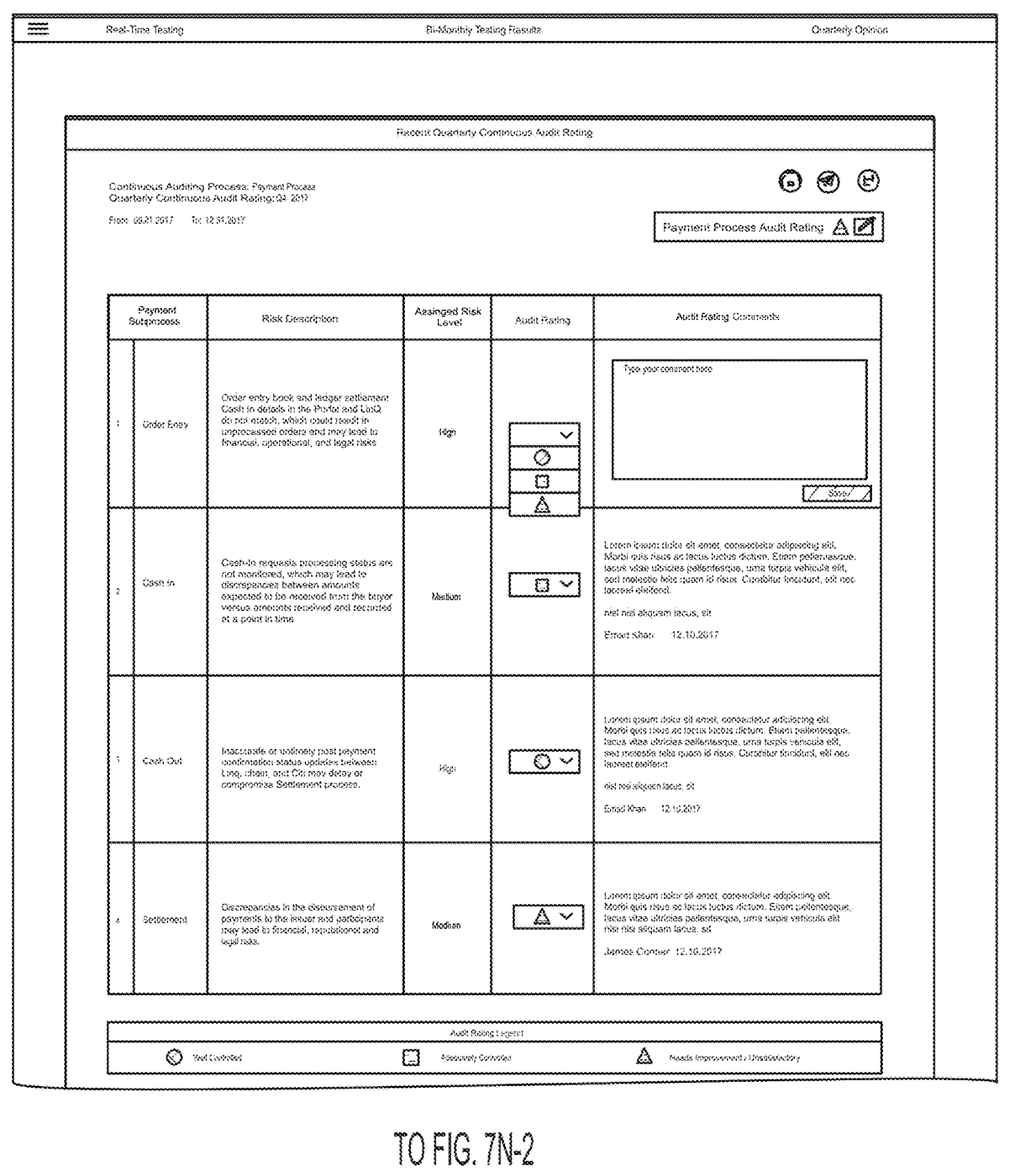
Figure 7N-2:
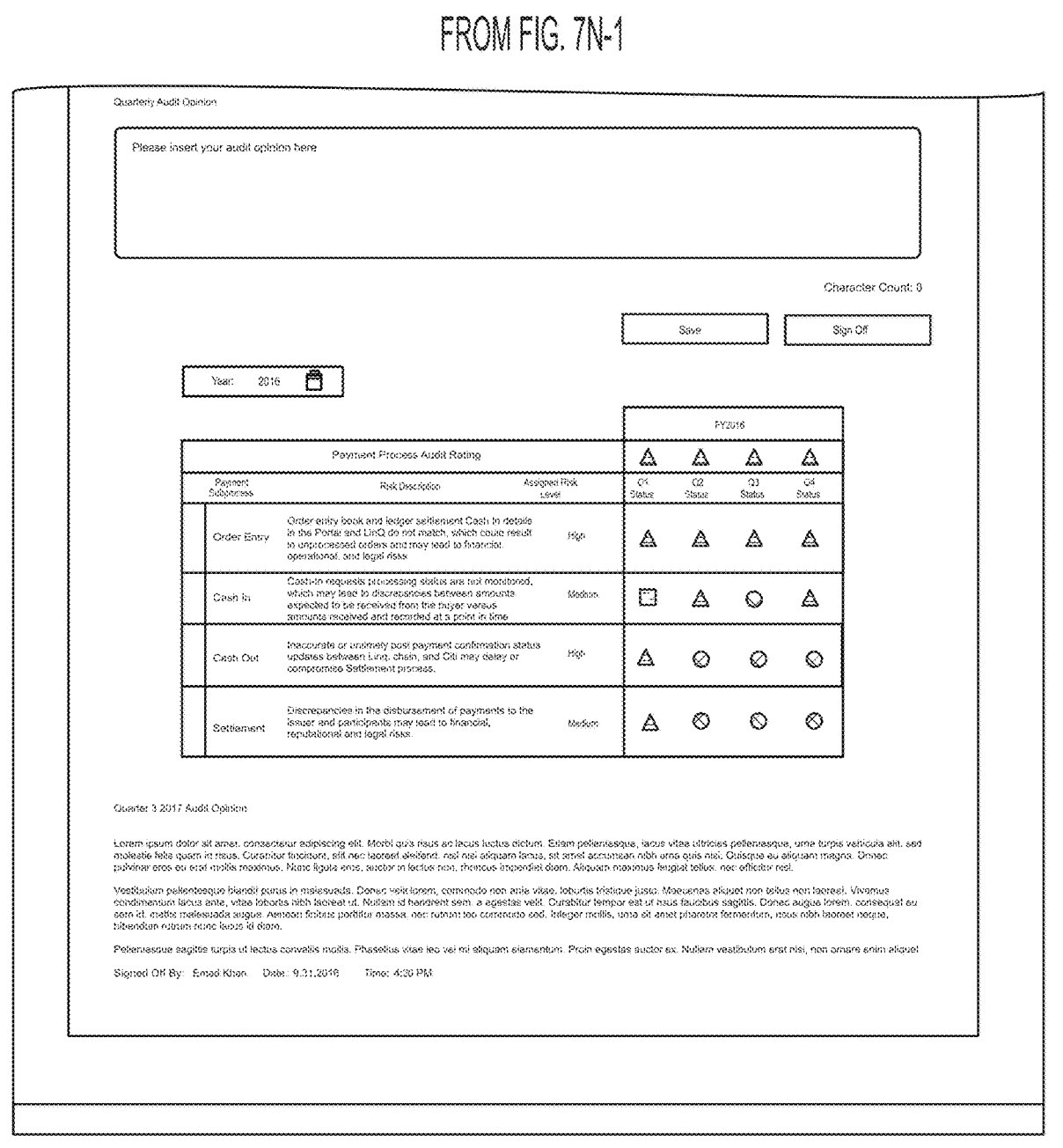
Figure 7P-2:
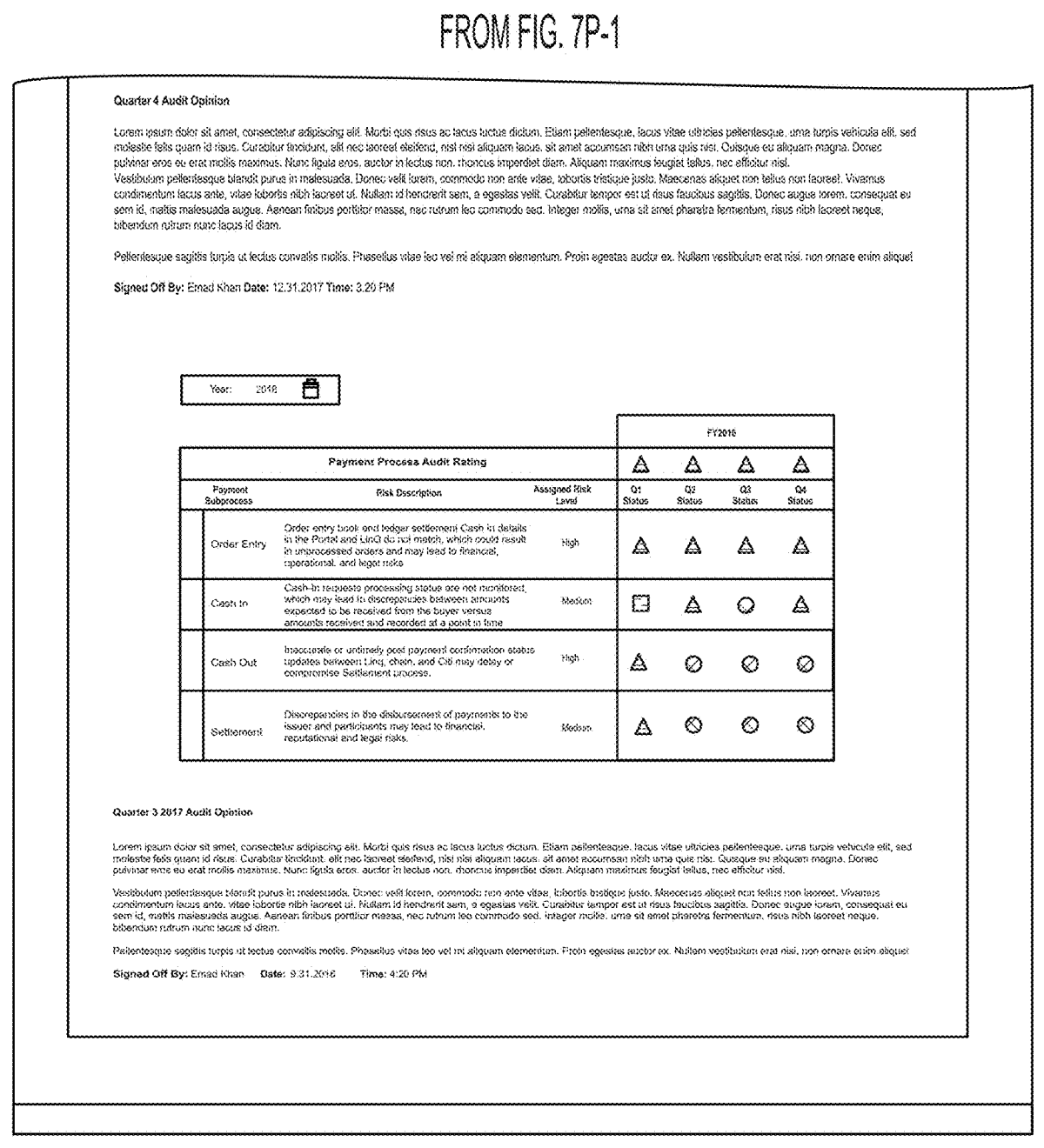
Figure 7R-1:
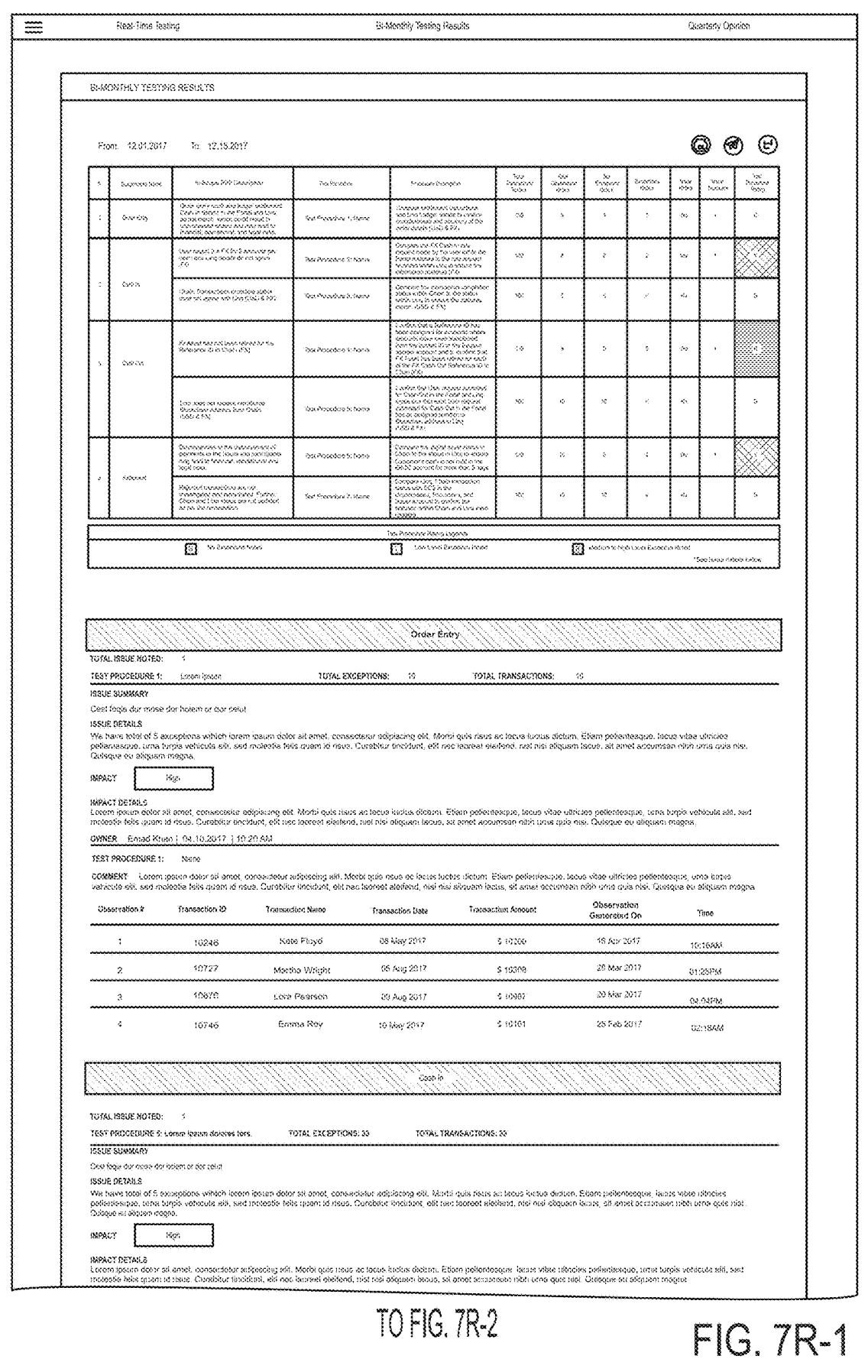
Figure 7R-2:
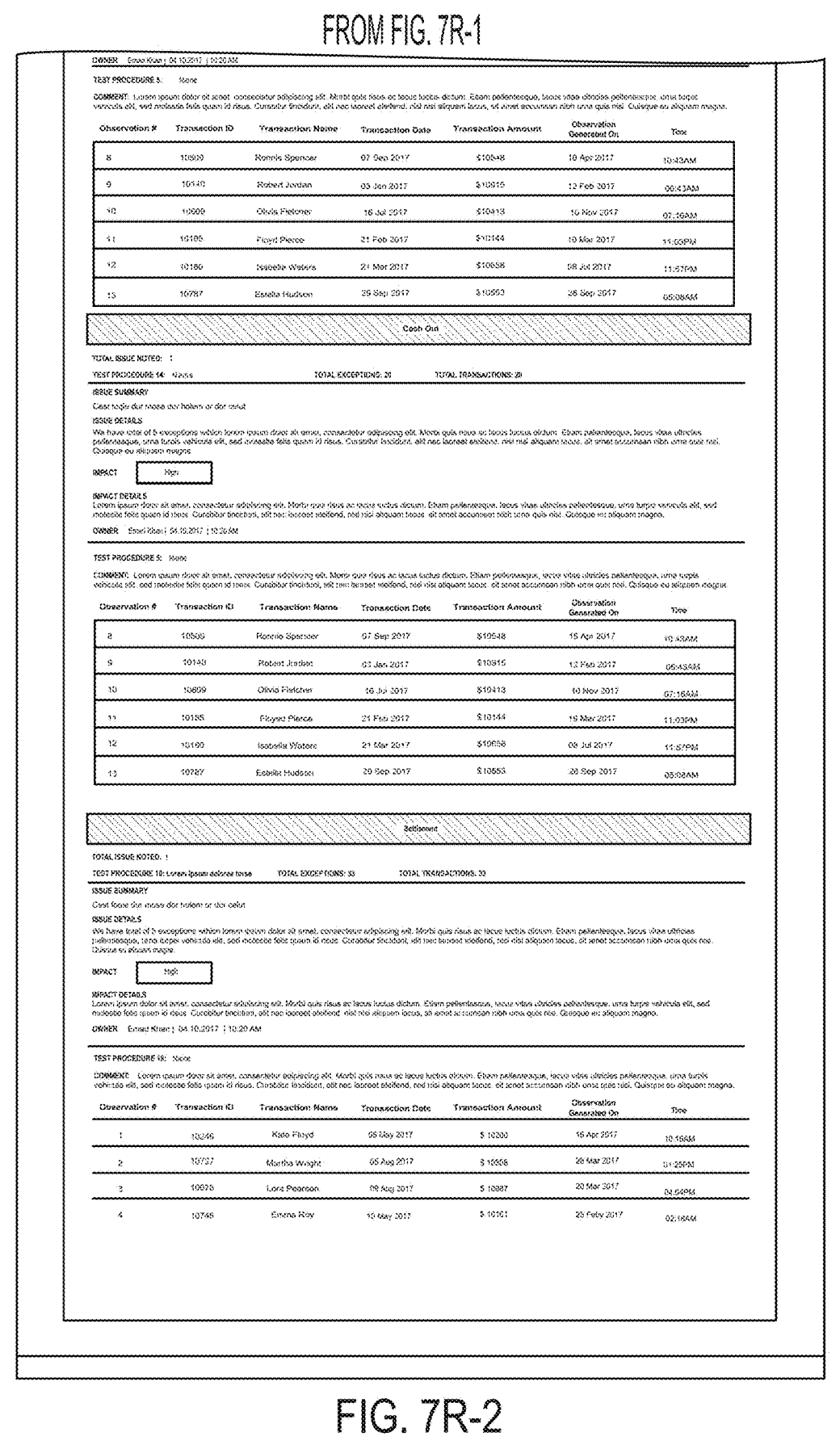

FIGS. 7A-7R illustrate exemplary screen shots of the reports that can be generated by the real-time auditing tool according to examples of the disclosure. The example screen shots illustrated in FIGS. 7A-7R illustrate exemplary graphical displays that can be provided to the user when operating the validation tool described above. For instance the screenshots include various view of an interim (bi-weekly report) that can be produced simultaneously or immediately after the testing of the blockchain computing environment is completed. Once the audit testing and other fieldwork activities (i.e. exception/deviation and issue) are complete, a practitioner/auditor can produce and issue interim audit reports including rating and details at the process and subprocess level to achieve continuous reporting and monitoring (or some other cadence if preferred (e.g. bi-monthly or monthly). After the interim reporting cycle for a quarter (or some other cadence if preferred) is complete, a practitioner can produce and issue a quarterly audit report including rating and opinion at process and subprocess level to the stakeholders. The testing and reporting can provide required assurance level information at the process and subprocess levels based on the applicable risks, controls, testing objectives and reporting parameters across entire population data set to address stakeholders needs. The Continuous Auditing/Monitoring Methodology provides a practitioner with an end-to-end audit standardized process and sets of activities to can be used obtain real-time transparency around given business process (i.e. Non-Blockchain and Blockchain) and provide compliance and audit type reporting automatically or manually. The methodology enables the practitioner to execute set of audit and compliance activities by the computer in a continuous fashion, which can bring significant increase in efficiency and effectiveness in achieving the higher/maximum level of confidence.

As the validation process outlined above can be conducted on a continuing basis, the reports shown in the FIGS. 7A-8R can also include opinionated process level reports that can be issued on a quarterly basis. Continuous auditing can produce a collection of audit evidence related to business processes which an auditor, using the Quarterly opinionated report, can provide a continuous or on-demand opinion on the state of business processes, applicable risk and control, or underlying transactional evidence in question.

Figure 8:
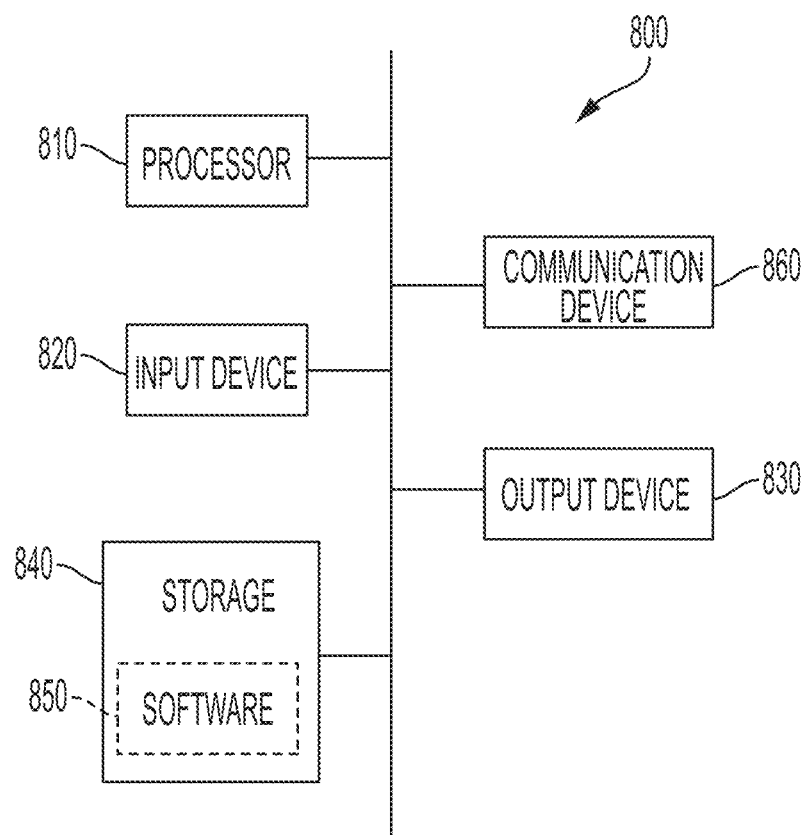
FIG. 8 illustrates an example of a computing device according to examples of the disclosure.

FIG. 8 illustrates an example of a computing device according to examples of the disclosure. Device 800 can be a host computer connected to a network. Device 800 can be a client computer or a server. As shown in FIG. 8, device 800 can be any suitable type of microprocessor-based device, such as a personal computer, workstation, server, or handheld computing device (portable electronic device) such as a phone or tablet. The device can include, for example, one or more of processor 810, input device 820, output device 830, storage 840, and communication device 860. Input device 820 and output device 830 can generally correspond to those described above and can either be connectable or integrated with the computer.

Input device 820 can be any suitable device that provides input, such as a touch screen, keyboard or keypad, mouse, or voice-recognition device. Output device 830 can be any suitable device that provides output, such as a touch screen, haptics device, or speaker.

Storage 840 can be any suitable device that provides storage, such as an electrical, magnetic, or optical memory, including a RAM, cache, hard drive, or removable storage disk. Communication device 860 can include any suitable device capable of transmitting and receiving signals over a network, such as a network interface chip or device. The components of the computer can be connected in any suitable manner, such as via a physical bus or wirelessly.

Software 850, which can be stored in storage 840 and executed by processor 810, can include, for example, the programming that embodies the functionality of the present disclosure (e.g., as embodied in the devices as described above).

Software 850 can also be stored and/or transported within any non-transitory computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 840, that can contain or store programming for use by or in connection with an instruction execution system, apparatus, or device.

Software 850 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate, or transport programming for use by or in connection with an instruction execution system, apparatus, or device. The transport readable medium can include, but is not limited to, an electronic, magnetic, optical, electromagnetic, or infrared wired or wireless propagation medium.

Device 800 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Device 800 can implement any operating system suitable for operating on the network. Software 850 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims.

This application discloses several numerical ranges in the text and figures. The numerical ranges disclosed inherently support any range or value within the disclosed numerical ranges, including the endpoints, even though a precise range limitation is not stated verbatim in the specification because this disclosure can be practiced throughout the disclosed numerical ranges.

The above description is presented to enable a person skilled in the art to make and use the disclosure and is provided in the context of a particular application and its requirements. Various modifications to the preferred embodiments will be readily apparent to those skilled in the art, and the generic principles defined herein may be applied to other embodiments and applications without departing from the spirit and scope of the disclosure. Thus, this disclosure is not intended to be limited to the embodiments shown, but is to be accorded the widest scope consistent with the principles and features disclosed herein. Finally, the entire disclosure of the patents and publications referred in this application are hereby incorporated herein by reference.

What is claimed is:

1. A computing system for performing real-time validation and auditing of a distributed ledger-based data storage system, the computing system comprising:
   a memory;
   one or more processors; and
   one or more programs, wherein the one or more programs are stored in the memory and configured to be executed by the one or more processors, the one or more programs when executed by the one or more processors cause the one or more processors to:

detect the presence of an event occurring on the distributed ledger-based data storage system;
store a copy of the event in the memory;
append metadata relating to the event to the stored copy of the event to generate an enriched data block;
perform one or more tests on the enriched data block, wherein the one or more tests are configured to be associated with one or more risks associated with the distributed ledger-based data storage system, and wherein performance of the one or more tests on the enriched data block generates one or more results;
format the one or more results into a report; and
transmit the report to a user.

2. The computing system of claim 1, wherein the event includes adding a new data block to the distributed ledger-based data storage system by a user of the distributed ledger-based data storage system.

3. The computing system of claim 1, wherein the computing system is implemented as a read-only node in the distributed-ledger based system.

4. The computing system of claim 1, wherein the one or more tests are generated by a risk framework, wherein the risk framework converts one or more risks identified by a user of the distributed-based ledger system into the one or more tests, and wherein the one or more tests generated by the risk framework are configured to mitigate the one or more risks identified by the user.

5. The computing system of claim 1, wherein the one or more processors are further caused to classify the enriched data block as either an exception or no exception based on the one or more results.

6. The computing system of claim 5, wherein when the enriched data block is classified as an exception, the one or more results of the one or more tests is transmitted to a user of the distributed ledger-based data storage system.

7. The computing system of claim 1, wherein the one or more processors are further caused to generate a plurality of reports, and wherein each report is transmitted to the user at pre-determined time intervals.

8. A method for performing real-time validation and auditing of a distributed ledger-based data storage system, the method comprising:
detecting the presence of an event occurring on the distributed ledger-based data storage system;
storing a copy of the event in the memory;
appending metadata relating to the event to the stored copy of the event to generate an enriched data block;
performing one or more tests on the enriched data block, wherein the one or more tests are configured to be associated with one or more risks associated with the distributed ledger-based data storage system, and wherein performance of the one or more tests on the enriched data block generates one or more results;
formatting the one or more results into a report; and
transmitting the report to a user.

9. The method of claim 8, wherein the event includes adding a new data block to the distributed ledger-based data storage system by a user of the distributed ledger-based data storage system.

10. The method of claim 8, wherein the method is implemented as a read-only node in the distributed-ledger based system.

11. The method of claim 8, wherein the one or more tests are generated by a risk framework, wherein the risk framework converts one or more risks identified by a user of the distributed-based ledger system into the one or more tests, and wherein the one or more tests generated by the risk framework are configured to mitigate the one or more risks identified by the user.

12. The method of claim 8, wherein the method further comprises classifying the enriched data block as either an exception or no exception based on the one or more results.

13. The method of claim 12, wherein when the enriched data block is classified as an exception, the one or more results of the one or more tests is transmitted to a user of the distributed ledger-based data storage system.

14. The method of claim 8, wherein the method further comprises generating a plurality of reports, and wherein each report is transmitted to the user at pre-determined time intervals.

15. A non-transitory computer readable storage medium storing one or more programs, the one or more programs comprising instructions for performing real-time validation and auditing of a distributed ledger-based data storage system that when executed by a electronic device, cause the device to:
detect the presence of an event occurring on the distributed ledger-based data storage system;
store a copy of the event in the memory;
appending metadata relating to the event to the stored copy of the event to generate an enriched data block;
perform one or more tests on the enriched data block, wherein the one or more tests are configured to be associated with one or more risks associated with the distributed ledger-based data storage system, and wherein performance of the one or more tests on the enriched data block generates one or more results;
format the one or more results into a report; and
transmit the report to a user.

16. The non-transitory computer readable storage medium of claim 15, wherein the event includes adding a new data block to the distributed ledger-based data storage system by a user of the distributed ledger-based data storage system.

17. The non-transitory computer readable storage medium of claim 15, wherein one or more programs are implemented as a read-only node in the distributed-ledger based system.

18. The non-transitory computer readable storage medium of claim 15, wherein the one or more tests are generated by a risk framework, wherein the risk framework converts one or more risks identified by a user of the distributed-based ledger system into the one or more tests, and wherein the one or more tests generated by the risk framework are configured to mitigate the one or more risks identified by the user.

19. The non-transitory computer readable storage medium of claim 15, wherein the electronic device is further caused to classify the enriched data block as either an exception or no exception based on the one or more results.

20. The non-transitory computer readable storage medium of claim 19, wherein when the enriched data block is classified as an exception, the one or more results of the one or more tests is transmitted to a user of the distributed ledger-based data storage system.

21. The non-transitory computer readable storage medium of claim 15, wherein the device is further caused to generate a plurality of reports, and wherein each report is transmitted to the user at pre-determined time intervals.

* * * * *